(12) United States Patent　(10) Patent No.: US 9,425,945 B2
Sugahara　(45) Date of Patent: Aug. 23, 2016

(54) SPECTRUM CONTROL SYSTEM, SPECTRUM CONTROL METHOD, WIRELESS COMMUNICATION SYSTEM, AND COMPUTER READABLE MEDIUM

(75) Inventor: Hiroto Sugahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 142 days.

(21) Appl. No.: 14/118,810

(22) PCT Filed: Mar. 9, 2012

(86) PCT No.: PCT/JP2012/001669
§ 371 (c)(1),
(2), (4) Date: Nov. 19, 2013

(87) PCT Pub. No.: WO2012/157158
PCT Pub. Date: Nov. 22, 2012

(65) Prior Publication Data
US 2014/0086194 A1　Mar. 27, 2014

(30) Foreign Application Priority Data
May 19, 2011　(JP) .................................. 2011-112814

(51) Int. Cl.
*H04W 4/00* (2009.01)
*H04L 5/00* (2006.01)
*H04W 28/16* (2009.01)
*H04W 16/06* (2009.01)
(Continued)

(52) U.S. Cl.
CPC ............. *H04L 5/0058* (2013.01); *H04W 16/06* (2013.01); *H04W 28/16* (2013.01); *H04W 16/04* (2013.01); *H04W 16/14* (2013.01)

(58) Field of Classification Search
None
See application file for complete search history.

(56) References Cited

U.S. PATENT DOCUMENTS

2002/0042276 A1* 4/2002 Hakalin et al. ................. 455/453
2002/0186710 A1* 12/2002 Alvesalo ............... H04W 16/14
　　　　　　　　　　　　　　　　　　　　　370/468
2003/0054763 A1* 3/2003 Judd et al. ........................ 455/20
(Continued)

FOREIGN PATENT DOCUMENTS

CN　101350700 A　1/2009
JP　H10-501952 A　2/1998
(Continued)

OTHER PUBLICATIONS

International Search Report for PCT Application No. PCT/JP2012/001669, mailed on May 29, 2012.
(Continued)

*Primary Examiner* — Gregory Sefcheck
*Assistant Examiner* — Jael Ulysse

(57) ABSTRACT

A spectrum control system according to the present invention includes an identifying unit that identifies a base station or a cell that does not satisfy a predetermined level of communication quality based on information regarding a network status collected by a collecting unit that collects information regarding a network status of a wireless communication system, an extracting unit that extracts a plurality of base stations or a plurality of cells including a base station or a cell other than the identified base station or the identified cell as additional band allocating candidates, and an allocating unit that allocates an additional band to the base station or the cell that satisfies a predetermined condition among the plurality of extracted base stations or the plurality of extracted cells.

26 Claims, 10 Drawing Sheets

(51) Int. Cl.
*H04W 16/14* (2009.01)
*H04W 16/04* (2009.01)

(56) References Cited

U.S. PATENT DOCUMENTS

| | | | |
|---|---|---|---|
| 2003/0109257 A1* | 6/2003 | Nilsson et al. | 455/436 |
| 2003/0109284 A1* | 6/2003 | Akerberg et al. | 455/561 |
| 2004/0156386 A1* | 8/2004 | Atarashi | H04B 1/69 370/441 |
| 2006/0211426 A1* | 9/2006 | Costa et al. | 455/450 |
| 2007/0280164 A1* | 12/2007 | Hayashi | H04W 72/048 370/331 |
| 2009/0129401 A1* | 5/2009 | Kang | H04W 16/12 370/431 |
| 2009/0161617 A1* | 6/2009 | Abedi | 370/329 |
| 2009/0186623 A1* | 7/2009 | Matsuzawa | H04W 16/30 455/447 |
| 2009/0191889 A1* | 7/2009 | Abedi | H04W 16/06 455/452.1 |
| 2009/0191906 A1* | 7/2009 | Abedi | H04W 16/14 455/501 |
| 2009/0227261 A1* | 9/2009 | Tiirola | H04W 16/10 455/450 |
| 2010/0008311 A1* | 1/2010 | Oh et al. | 370/329 |
| 2010/0027492 A1* | 2/2010 | Asanuma | 370/329 |
| 2010/0062764 A1* | 3/2010 | Aiouaz et al. | 455/434 |
| 2010/0144365 A1 | 6/2010 | Pan et al. | |
| 2010/0248638 A1* | 9/2010 | Harada et al. | 455/67.11 |
| 2010/0279653 A1* | 11/2010 | Poltorak | H04M 15/00 455/410 |
| 2011/0002314 A1* | 1/2011 | Choi et al. | 370/338 |
| 2011/0237268 A1* | 9/2011 | Tsuda | 455/450 |
| 2011/0256878 A1* | 10/2011 | Zhu | H04W 24/02 455/450 |
| 2011/0286408 A1* | 11/2011 | Flore | H04L 5/0007 370/329 |
| 2012/0224481 A1* | 9/2012 | Babiarz et al. | 370/230.1 |
| 2012/0282942 A1* | 11/2012 | Uusitalo et al. | 455/452.2 |
| 2013/0083722 A1* | 4/2013 | Bhargava | H04W 72/085 370/315 |

FOREIGN PATENT DOCUMENTS

| | | |
|---|---|---|
| JP | 2002-112323 A | 4/2002 |
| JP | 2006-211271 A | 8/2006 |
| WO | 2008/004561 A1 | 1/2008 |

OTHER PUBLICATIONS

Athina Bourdena et al. "D6.1 Dynamic Radio Resource Management algorithms for an efficient use of TVWS," FP7 COGEU Project, Deliverable D6.1, Dec. 2010.

Chinese Office Action for CN Application No. 201280024363.8 mailed on Mar. 28, 2016 with English Translation.

* cited by examiner

SPECTRUM CONTROL SYSTEM, SPECTRUM CONTROL METHOD, WIRELESS COMMUNICATION SYSTEM, AND COMPUTER READABLE MEDIUM

This application is a National Stage Entry of PCT/JP2012/001669 filed on Mar. 9, 2012, which claims priority from Japanese Patent Application 2011-112814 filed on May 19, 2011, the contents of all of which are incorporated herein by reference, in their entirety.

TECHNICAL FIELD

The present invention relates to a spectrum control system and a spectrum control method that temporarily allocate a new frequency band (an additional band) to a base station in a wireless communication system in addition to a frequency band that is usually used by the base station. The present invention further relates to a spectrum control program regarding the spectrum control method, a non-transitory computer readable medium storing the program, and a wireless communication system using the spectrum control method.

BACKGROUND ART

By richer contents of cellular phones and the spread of flat rate, the traffic volume in the wireless communication continues to increase. In order to handle such an increase in the traffic volume, it is necessary to expand the frequency band used in the wireless communication system. However, frequency bands such as the UHF band, which are suitable for mobile communication, have already been licensed to various wireless systems. It is thus difficult to license a new frequency band to the existing wireless communication system.

Meanwhile, some frequency bands that have already been allocated to particular systems are not used in some regions or at particular time. There is usage under consideration in which a wireless communication system with high traffic demand temporarily uses such a vacant frequency band (white space) and a shared band not licensed to any wireless system. This usage achieves improvement in the transmission speed of the wireless communication system and efficient use of frequencies.

However, when the frequency band is shared in this way, it is required not to introduce harmful interference to other wireless systems and other base stations in the same system. Especially when the licensed band is used secondarily, reliable protection of the licensed system (primary system) is necessary.

A spectrum control system is presented as a technique to achieve this. FIG. 8 is a conceptual diagram of a wireless system using the spectrum control system. A spectrum control system 10 is connected to a plurality of wireless systems including a wireless communication system and recognizes frequency utilization of base stations 1011 and 1012 in a wireless communication system 1000 and a transmitting station 2011 in other wireless system 2000.

The base stations 1011 and 1012 in the wireless communication system 1000 perform wireless communication with terminals subordinate to the base stations using licensed bands f1 and f2, which are provided to the base stations 1011 and 1012, respectively. Here, suppose that the communication load of the base station 1011 temporarily increases, and a desired communication capacity cannot be satisfied. At this time, the spectrum control system 10 determines a frequency band to be additionally allocated to the base station 1011, transmission power, and an available period, taking into consideration of interference imposed on other wireless systems and other base stations in the same system and regulation regarding frequency use in the corresponding region.

In addition to the above-mentioned licensed band, the base station 1011 secondarily uses a frequency band f3 that is licensed to the wireless system 2000 or uses a shared band f4 that is not licensed to any wireless system, in accordance with allocation by the spectrum control system 10. Then, the communication capacity can be increased.

As a control method of such a spectrum control system, there is a method disclosed in non patent literature 1. FIG. 9 is a system configuration diagram of a wireless communication system disclosed in non patent literature 1.

A network monitoring unit 900 monitors service quality of a wireless communication system. A necessary band evaluating unit 910 evaluates current service quality acquired by the network monitoring unit 900 against a required value so as to evaluate how many additional bands are needed. An available band database (DB) 90 stores a list of available frequency bands according to the position of a transmitting station. An additional band negotiating unit 920 sends parameters including position information of the transmitting station to the available band DB 90 so as to acquire frequency bands available to the transmitting station. The additional band negotiating unit 920 determines the additional band to be used by a base station 1009 based on the available frequency bands and notifies a network setting unit 930 of information of the determined additional band. The network setting unit 930 allocates the additional band to the base station 1009 when the notified additional band is sufficient to satisfy a required value of the service level in the wireless communication system based on the information of the additional band notified from the additional band negotiating unit 920. When the additional band is not sufficient to satisfy the required value of the service level, the network setting unit 930 requests the necessary band evaluating unit 910 to further allocate the additional band.

CITATION LIST

Non Patent Literature

Non patent literature 1: FP7 COGEU Project, "Dynamic Radio Resource Management algorithms for an efficient use of TVWS", Deliverable D6.1, 2010.

SUMMARY OF INVENTION

Technical Problem

The spectrum control system of the non patent literature 1 allocates the additional band to the base station that is no longer capable of satisfying the predetermined level of quality when licensed bands provided to the wireless communication system are all in use. However, in the environment of actual use, even when the additional band is allocated to the base station that is no longer capable of satisfying the predetermined level of quality, the characteristics of the wireless communication system cannot be greatly improved sometimes.

For example, in the case where the base station that is no longer capable of satisfying the predetermined level of quality does not include a communication function in the additional band, even when the spectrum control system allocates the additional band to the base station, the characteristics cannot be improved as the base station is unable to use the additional band.

In view of the above issue, an object of the present invention is to provide a spectrum control system, a spectrum control method, a wireless communication system, and a spectrum control program for greatly improving the characteristics of a wireless communication system in usage that temporarily allocates an additional band to a limited base station in addition to a frequency band that is usually used by the base station of the wireless communication system.

Solution to Problem

A spectrum control system according to the present invention includes identifying means for identifying a base station or a cell that does not satisfy a predetermined level of communication quality based on information regarding a network status, extracting means for extracting a plurality of base stations or a plurality of cells including a base station or a cell other than the identified base station or the identified cell as additional band allocating candidates, and allocating means for allocating an additional band to the base station or the cell that satisfies a predetermined condition among the plurality of extracted base stations or the plurality of extracted cells.

Further, a spectrum control method according to the present invention includes steps of identifying a base station or a cell that does not satisfy a predetermined level of communication quality based on information regarding a network status, extracting a plurality of base stations or a plurality of cells including a base station or a cell other than the identified base station or the identified cell as additional band allocating candidates, and allocating an additional band to the base station or the cell that satisfies a predetermined condition among the plurality of extracted base stations or the plurality of extracted cells.

Furthermore, a wireless communication system according to the present invention uses a spectrum control method including steps of identifying a base station or a cell that does not satisfy a predetermined level of communication quality based on information regarding a network status, extracting a plurality of base stations or a plurality of cells including a base station or a cell other than the identified base station or the identified cell as additional band allocating candidates, and allocating an additional band to the base station or the cell that satisfies a predetermined condition among the plurality of extracted base stations or the plurality of extracted cells.

Moreover, a non-transitory computer readable medium according to the present invention storing a spectrum control program that causes a computer to execute an identifying process that identifies a base station or a cell that does not satisfy a predetermined level of communication quality based on information regarding a network status, an extracting process that extracts a plurality of base stations or a plurality of cells including a base station or a cell other than the identified base station or the identified cell as additional band allocating candidates, and an allocating process that allocates an additional band to the base station or the cell that satisfies a predetermined condition among the plurality of extracted base stations or the plurality of extracted cells.

Advantageous Effects of Invention

According to the present invention, it is possible to provide the spectrum control system, the spectrum control method, the wireless communication system, and the non-transitory computer readable medium for greatly improving the characteristics of the wireless communication system in usage that temporarily allocates the additional band to the limited base station in addition to the frequency band that is usually used by the base station of the wireless communication system.

DESCRIPTION OF EMBODIMENTS

First Embodiment

Figure 1:
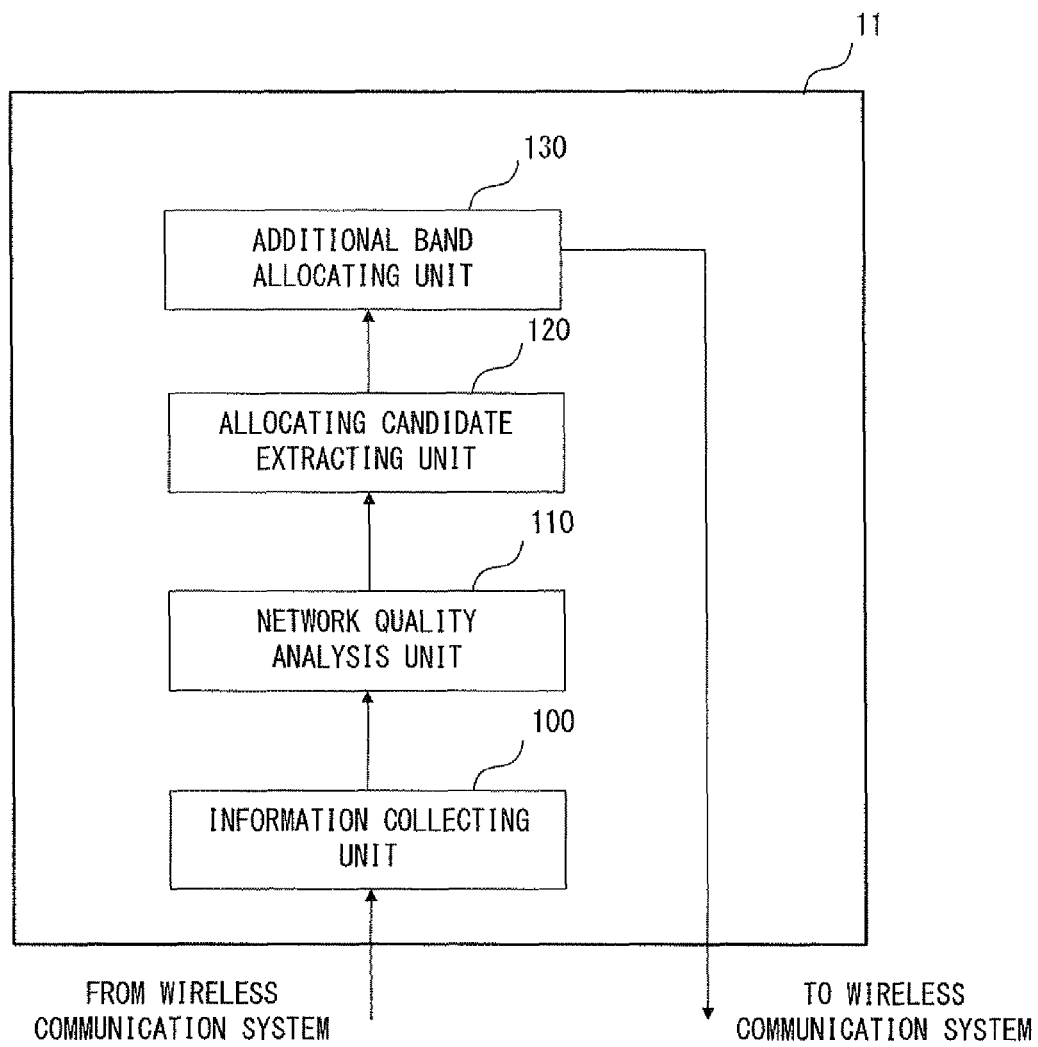
FIG. 1 is a block diagram of a spectrum control system according to a first embodiment.

Hereinafter, embodiments of the present invention are explained with reference to the drawings. FIG. 1 is a block diagram of a spectrum control system 11 according to a first embodiment of the present invention. The spectrum control system 11 is connected to at least one wireless communication system. Each base station belonging to the wireless communication system performs wireless communication with subordinate communication terminals using a licensed band that has been allocated in advance. Hereinafter, a configuration of the spectrum control system 11 is explained in detail.

The spectrum control system 11 includes an information collecting unit 100, a network quality analysis unit 110, an allocating candidate extracting unit 120, and an additional band allocating unit 130.

The information collecting unit 100 collects information regarding a current network status from a wireless communication system to be controlled by the spectrum control system 11. The information collecting unit 100 aggregates the collected information regarding the network status and sends the aggregated information to the network quality analysis unit 110.

The term "current" here refers to the state before the allocation of an additional band, which is under consideration to be allocated, and at that point, the wireless communication system is using only the licensed band or the licensed band and an additional band that has already been allocated at that time.

Moreover, the information regarding the network status refers to the information indicating the communication quality of the network. Specifically, the information regarding the network status includes KPI (Key Performance Indicator) such as traffic volume of each base station, utilization rates of wireless resources, and an abnormal call drop rate, system throughput, and further, throughput and delay in terminals subordinate to the base station, and statistical values including reception signal power and signal-to-noise interference ratio (e.g., an average value, bottom 5% values, and a histogram of each wireless quality). These pieces of information are collectively referred to as network quality information.

The information regarding the network status may further include information on whether or not the terminals subordinate to the base station are capable of communicating in the additional band. Such information is referred to as terminal capability information.

The network quality analysis unit 110 identifies a base station, a cell, or the like that does not satisfy a predetermined level of communication quality, for example a base station, a cell, or the like that does not satisfy a desired communication capacity, based on the information regarding the network status that is received from the information collecting unit 100. Specifically, the network quality analysis unit 110 performs comparison processing between a current value of network quality in each base station or cell that is identified based on the information regarding the network status and a required value to be a predetermined reference. As a result of the comparison processing, when the current value of the predetermined base station or cell is less than the required value, the network quality analysis unit 110 evaluates that the corresponding base station or cell is no longer capable of satisfying the predetermined level of quality. Hereinafter, both the base stations and the cell that do not satisfy the predetermined level of quality shall be referred to as a quality degraded base station.

As a result of the comparison processing, when the network quality analysis unit 110 evaluates that the quality degraded base station is present in the network and it is necessary to allocate the additional band, the network quality analysis unit 110 requests the allocating candidate extracting unit 120 to allocate the additional band. In the case of requesting the additional band allocation, the network quality analysis unit 110 sends, to the allocating candidate extracting unit 120, information regarding the quality degraded base station together with the information regarding the network status that is collected by the information collecting unit 100 and the like. Note that the information regarding the quality degraded base station includes, for example, a base station ID for identifying the quality degraded base station.

Here, the additional band refers to a band different from a band that is already licensed (licensed band) to the wireless communication system and refers to the band to be additionally allocated to the wireless communication system by the spectrum control system 11. As a band of this type, there is a vacant frequency band (white space) that is not used in some regions or at particular time and a shared band that is not licensed to any wireless system.

In response to the additional band allocation request from the network quality analysis unit 110, the allocating candidate extracting unit 120 extracts the base stations or cells to be candidates that are allocated with the additional band.

Specifically, the allocating candidate extracting unit 120 extracts a plurality of base stations or cells including the quality degraded base station as additional band allocating candidates, which are the candidate base stations (cells) to be allocated with the additional band, based on the information regarding the quality degraded base station received from the network quality analysis unit 110. That is, the allocating candidate extracting unit 120 extracts not only the quality degraded base station but the base stations (cells) other than the quality degraded base station as the additional band allocating candidates. Accordingly, the base station (cell) that satisfies the predetermined level of communication quality is also extracted as the additional band allocating candidate as needed depending on the relationship with the quality degraded base station.

Here, for example a peripheral base station (peripheral cell) of the quality degraded base station is selected as the base station (cell) to be the additional band allocating candidate that is extracted by the allocating candidate extracting unit 120. Specifically, the allocating candidate extracting unit 120 can extract the quality degraded base station and the base station or cell adjacent to the quality degraded base station as the additional band allocating candidates.

The allocating candidate extracting unit 120 can further extract the base station or cell having coverage overlapping with coverage of the quality degraded base station as the additional band allocating candidates together with the quality degraded base station. As such an environment, there is an environment in which macrocell and microcell base stations having antennas installed on a tower or a building roof and a picocell base station having an antenna installed at a lower position such as on a telephone pole are located in the same area, so that the coverage of the macrocell and microcell base station and the picocell station overlap. Such an environment is referred to as the heterogeneous network. When the allocating candidate extracting unit 120 is notified from the network quality analysis unit 110 that the microcell micro base station or the picocell pico base station is the quality degraded base station, the allocating candidate extracting unit 120 can extract both the microcell micro base station and the picocell pico base station as the additional band allocating candidates.

In performing the above-mentioned extraction, the allocating candidate extracting unit 120 refers to base station information, which is detailed information of each base station (cell), so as to determine the plurality of base stations (cells) to be the additional band allocating candidates. Such base station information may be stored to a storage unit provided inside the allocating candidate extracting unit 120 or may be stored to a base station DB provided outside the allocating candidate extracting unit 120. The allocating candidate extracting unit 120 may, for example as the information regarding the quality degraded base station, acquire detailed information regarding the quality degraded base station from the base station information retrieved using, as a search word, the base station ID of the quality degraded base station that is notified from the network quality analysis unit 110, so as to determine the base stations (cells) to be the additional band allocating candidates.

The allocating candidate extracting unit 120 sends the information regarding the extracted additional band allocating candidate to the additional band allocating unit 130. At this time, the allocating candidate extracting unit 120 also sends the information regarding the network status received from the network quality analysis unit 110 to the additional band allocating unit 130.

The additional band allocating unit 130 actually allocates the additional band to the base station (cell) that satisfies a predetermined condition among the base stations (cells) to be the allocating candidates that are extracted by the allocating candidate extracting unit 120.

The above-mentioned predetermined condition here may be such that the base station (cell) includes a communication function in the additional band. That is, the additional band allocating unit 130 allocates the additional band to the base station or cell including the communication function in the additional band among the plurality of base stations or cells extracted by the allocating candidate extracting unit 120.

Even when the quality degraded base station does not include the communication function in the additional band, the additional band allocating unit 130 allocates the additional band to the base station (cell) including the communication function among the additional band allocating candidates, thereby greatly improving the characteristics of the wireless communication system. For example, even when the base station is no longer capable of satisfying the predetermined level of quality and the base station does not include the function to communicate in the additional band, the additional band can be allocated to a different neighboring base station. By doing so, it is possible to expect distribution of loads and reduction in the interference thereby to greatly improve the characteristics of the wireless communication system.

Moreover, the above-mentioned predetermined condition may be such that the number or a ratio of the subordinate terminals exceeds a predetermined value. Specifically, the additional band allocating unit 130 allocates the above-mentioned additional band to the base station or cell having the number or the ratio of the subordinate terminals including the communication function in the additional band exceeding the predetermined value among the plurality of base stations or cells extracted by the allocating candidate extracting unit 120.

Even when there is almost no terminal including the communication function in the additional band among the subordinate terminals of the quality degraded base station, the additional band allocating unit 130 allocates the additional band to the base station or cell having the number or the ratio of subordinate terminals exceeding the predetermined value among the additional band allocating candidates, thereby greatly improving the characteristics of the wireless communication system. For example, even when the base station is no longer capable of satisfying the predetermined level of quality and the base station has almost no subordinate terminal including the communication function in the additional band, the additional band can be allocated to a different neighboring base station. By doing so, it is possible to expect distribution of loads and reduction in the interference thereby to greatly improve the characteristics of the wireless communication system.

Other predetermined condition may be such that allowed transmission power that should be complied with in the case of using the additional band exceeds a predetermined value. Specifically, the additional band allocating unit 130 allocates the additional band to the base station or cell that has the allowed transmission power to be complied with in the case of using the additional band exceeding the predetermined value among the plurality of base stations or cells extracted by the allocation candidate extracting unit 120.

In the regulation regarding the use of the additional band, there may be a case where the allowed transmission power to be complied with in the case of using the additional band is different depending on the installation states of the base stations (i.e., installation height of the transmission antenna and types of fixed and mobile station). For example, a possible case is that the higher the installation height of the transmission antenna of the base station, the smaller the transmission power to be limited. In this case, for example in the case where the quality degraded base station is installed at a position high above the ground, even when the base station uses the additional band, the transmission power is limited to be small, and it is thus not possible to greatly improve the characteristics.

However, by the additional band allocating unit 130 allocating the additional band to an appropriate base station (cell) in accordance with the above condition, even when the allowed transmission power to be complied with in the case of using the additional band is different depending on the installation states of the base stations, it is possible to greatly improve the characteristics of the wireless communication system. For example, even when the base station is no longer capable of satisfying the predetermined level of quality and the base station is installed at a position high above the ground, the additional band can be allocated to a different neighboring base station installed at a position close to the ground. By doing so, it is possible to expect distribution of loads and reduction in the interference thereby to greatly improve the characteristics of the wireless communication system.

Moreover, other predetermined condition may be such that an estimated amount of interference imposed on other system when the additional band is allocated to the base station or cell is less than a predetermined value. Specifically, the additional band allocating unit 130 allocates the additional band to the base station or cell that has the estimated amount of interference imposed on other system (e.g., primary system) that is different from the base station or cell when the additional band is allocated is less than the predetermined value among the plurality of base stations or cells extracted by the allocating candidate extracting unit 120.

In the regulation regarding the use of the additional band, there can be a regulation for the allowed transmission power that is determined by estimating an expected amount of interference imposed on the primary system when the base station uses the additional band before using the additional band and specifying the allowed transmission power such that the estimated amount of interference will be equal to or less than a specified value. In this case, for example in the case where the quality degraded base station and a receiver of the primary system are line-of-sight or the main axis of the antenna of the quality degraded base station faces the direction of the receiver of the primary system, even when the base station uses the additional band, the transmission power is limited to be small, thereby not greatly improving the characteristics.

However, by the additional band allocating unit 130 allocating the additional band to an appropriate base station (cell) in accordance with the above condition, even under the above-mentioned regulation regarding the use of the additional band, it is possible to greatly improve the characteristics of the wireless communication system. For example, even when the base station is no longer capable of satisfying a predetermined level of quality and the base station and the receiver of the primary system are line-of-sight or the main axis of the antenna of the quality degraded base station faces the direction of the receiver of the primary system, the characteristics of the wireless communication system can be greatly improved. This is because that it is possible to expect distribution of loads and reduction in the interference by allocating the additional band to a different base station near the above-mentioned quality degraded base station.

Note that the predetermined conditions are not limited to those mentioned above but may be such that an estimated coverable range when the base station (cell) uses the additional band exceeds a predetermined value, for example. Moreover, the predetermined condition may be such that when the terminal, which is subordinate to the base station (cell) not satisfying the predetermined level of communication quality before using the additional band, uses the additional band, the number or the ratio of the terminals estimated to perform communication in the additional band exceeds a predetermined value. Further, a combination of these conditions may be used as the predetermined condition to allocate the additional band in practice.

The additional band allocating unit 130 uses the decision on whether the above-mentioned predetermined conditions are satisfied as one of decision criteria, determines the base station (cell) to be actually allocated with the additional band among the base stations (cells) to be the additional band allocating candidates, and allocates the additional band to the determined base station (cell).

As explained above, in the spectrum control system of the first embodiment, not only the quality degraded base station but other base station (cell) that can contribute to improvement of the communication quality of the quality degraded base station shall also be included as the additional band allocating candidates. As such a base station, there is a base station (cell) which is in an interfering relationship with the quality degraded base station. In this manner, with the configuration providing a certain degree of freedom on the allocation of the additional band to the base station, it is possible to flexibly allocate the additional band. Therefore, in the case where the improvement in the quality can be hardly expected even when the additional band is allocated to the quality degraded base station itself, it is possible to improve the quality by allocating the additional band to the other base station (cell).

Note that in the above-explained spectrum control system 11, all or a part of the information collecting unit, the network quality analysis unit, the allocating candidate extracting unit, the additional band allocating unit may be implemented in one spectrum control apparatus as functional blocks composing the apparatus. Alternatively, each of the above units may be independent apparatuses and located in the spectrum control system. In other words, the spectrum control system may be composed of an information collection apparatus, a network quality analysis apparatus, an allocating candidate extracting apparatus, and an additional band allocating apparatus that are connected to one other.

Further, the extraction processing performed by the allocating candidate extracting unit may be incorporated in a part of the allocation processing performed by the additional band allocating unit. In such a case, a configuration may be employed in which the allocating candidate extracting unit is provided in the additional band allocating unit, and the additional band allocating unit performs the extraction processing for extracting the additional band allocating candidates and the determination processing for determining the base station or cell to be actually allocated with the additional band among the extracted additional band allocating candidates.

Second Embodiment

Figure 2:
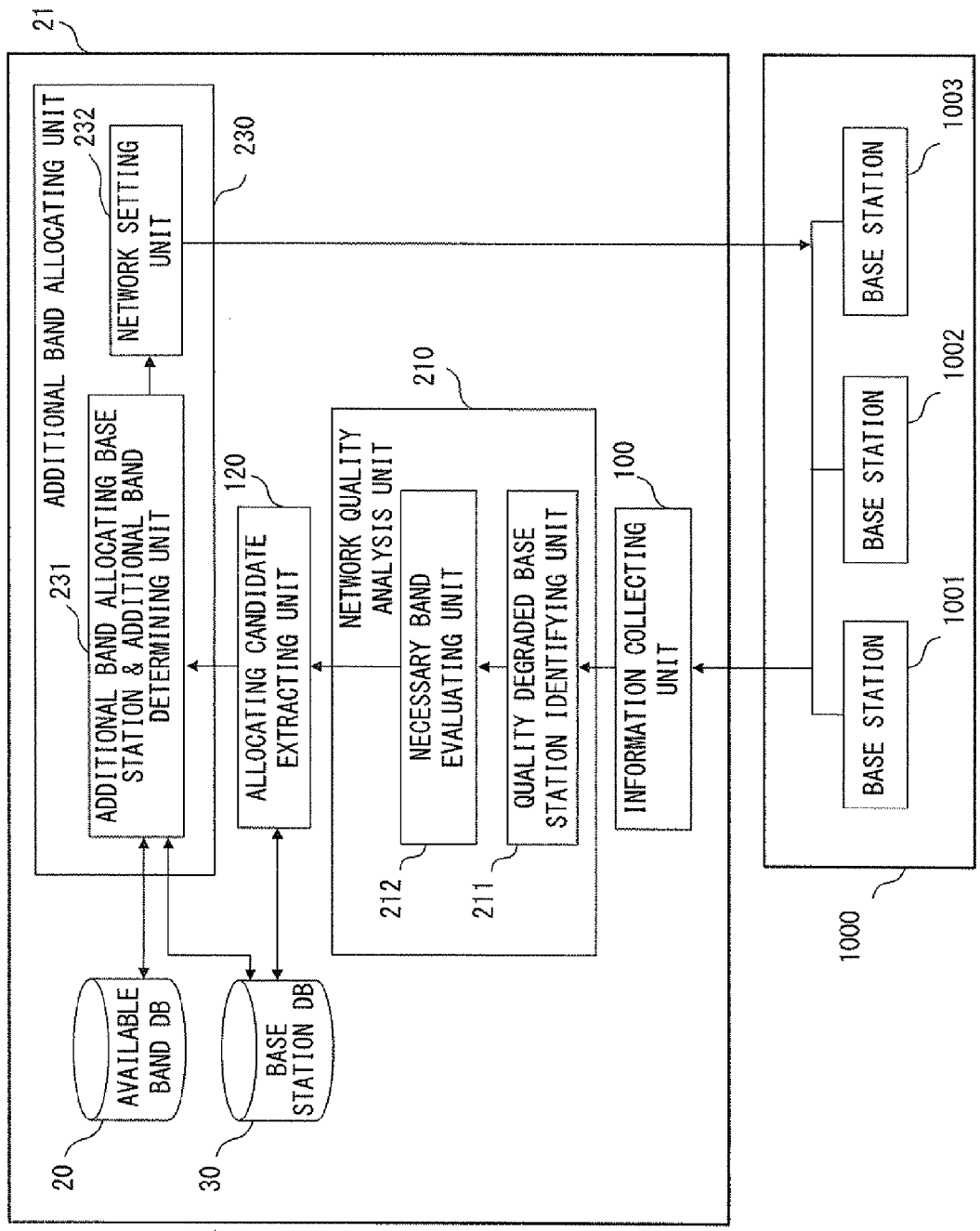
FIG. 2 is a block diagram of a spectrum control system according to a second embodiment.

Hereinafter, a second embodiment of the present invention is explained with reference to the drawings. FIG. 2 is a drawing showing a configuration of a spectrum control system 21 according to the second embodiment of the present invention. The spectrum control system 21 is connected to a wireless communication system 1000 including base stations 1001 to 1003.

The spectrum control system 21 includes an available band DB 20, a base station DB 30, an information collecting unit 100, a network quality analysis unit 210, an allocating candidate extracting unit 120, and an additional band allocating unit 230. The network quality analysis unit 210 includes a quality degraded base station identifying unit 211 and a necessary band evaluating unit 212. The additional band allocating unit 230 includes an additional band allocating base station and additional band determining unit 231 and a network setting unit 232. Each block is explained in detail below. However, the blocks already explained in the first embodiment shall not be explained in part.

The available band DB 20 is a database that stores a list of available frequency bands according to the position of a transmitting station. The transmitting station here includes an access point, a broadcasting station, and the like in other wireless system in addition to the base station used in the wireless communication system. With the available band DB 20, it is possible to acquire the frequency bands available to the transmitting station based on position information of the transmitting station wishing to use the additional band.

The base station DB 30 is a database that stores base station information, which is detailed information regarding the base stations to be controlled by the spectrum control system 21 including the base stations 1001 to 1003. In this embodiment, the base station DB 30 stores at least the information regarding whether or not each base station is capable of communicating in the additional band.

The information collecting unit 100 collects the information regarding the current network status from the base stations to be controlled by the spectrum control system 21. The information regarding the network status includes the above-mentioned network quality information. The information collecting unit 100 aggregates the collected information and sends the aggregated information to the network quality analysis unit 210.

In response to the information regarding the network status from the information collecting unit 100, the network quality analysis unit 210 outputs the network quality information included in the information to the quality degraded base station identifying unit 211. The quality degraded base station identifying unit 211 identifies the quality degraded base station based on the network quality information. Specifically, the quality degraded base station identifying unit 211 performs comparison processing, for each base station to be evaluated, between a current value of network quality and a required value to be a predetermined reference based on the network quality information. As a result of the comparison processing, when the current value of the predetermined base station or cell is less than the required value, the quality degraded base station identifying unit 211 evaluates that the corresponding base station or cell is not satisfying the predetermined level of quality and identifies the base station or cell as the quality degraded base station.

The necessary band evaluating unit 212 evaluates the current value of the network quality against the required value so as to evaluate how many additional bands are required. Specifically, the necessary band evaluating unit 212 decides that the additional bands are required for the number of quality degraded base stations that are identified by the quality degraded base station identifying unit 211 in the comparison processing between the current value of the network quality for each base station and the required value and calculates a quantity of necessary additional bands.

The information regarding the quality degraded base station identified by the quality degraded base station identifying unit 211 and the information regarding the quantity of additional bands calculated by the necessary band evaluating unit 212 is sent to the allocating candidate extracting unit 120 together with the information regarding the network status collected by the information collecting unit 100 in the form of a request for allocating the additional band.

The allocating candidate extracting unit 120 refers to the base station information stored to the base station DB 30 and extracts the base station (cell) candidates to be allocated with the additional band, based on the information regarding the quality degraded base station sent in a similar manner as the first embodiment. The allocating candidate extracting unit 120 may determine how many base stations (cells) to be extracted as the additional band allocating candidates based on the information regarding the quantity of additional bands received from the necessary band evaluating unit 212. When the quality of the quality degraded base station is severely degraded and many additional bands are required, the allocating candidate extracting unit 120 may extract a number of base stations (cells) to be the additional band allocating candidates. The information regarding the extracted additional band allocating candidates is sent to the additional band allocating unit 230 together with other information received from the network quality analysis unit 210.

The additional band allocating base station and additional band determining unit 231 provided in the additional band allocating unit 230 determines the base station to be actually allocated with the additional band and the additional band in accordance with an allocating procedure described later based on various information sent from the allocating candidate extracting unit 120 with reference to the available band DB 20 and the base station DB 30. The additional band allocating base station and additional band determining unit 231 notifies the network setting unit 232 of the information of the determined base station to be allocated with the additional band and the determined additional band.

The network setting unit 232 changes network setting for allocating the additional band to the additional band allocating base station determined by the additional band allocating base station and additional band determining unit 231. In a similar manner as the network setting unit disclosed in non patent literature 1, when the allocated additional band is not sufficient to satisfy the required value of the network quality, the network setting unit 232 may request the necessary band evaluating unit 212 to further allocate the additional band.

The base stations 1001 to 1003 are base stations in the wireless communication system 1000. The base stations 1001 to 1003 notify the information collecting unit 100 of the information regarding the network status such as the network quality information of the base stations 1001 to 1003 and the terminal capability information. Moreover, the base stations 1001 to 1003 communicate with subordinate communication terminals using the additional band in accordance with the setting specified by the network setting unit 232.

Note that in the system configuration diagram shown in FIG. 2, the spectrum control system 21 is explained to include the available band DB 20, the base station DB 30, the information collecting unit 100, the quality degraded base station identifying unit 211, the necessary band evaluating unit 212, the allocating candidate extracting unit 120, the additional band allocating base station and additional band determining unit 231, and the network setting unit 232. However, this embodiment is not limited to this. For example, the available band DB 20 may be located on the Internet accessible to anyone as a database for investigating the available band. Further, the base station DB 30, the information collecting unit 100, the quality degraded base station identifying unit 211, the necessary band evaluating unit 212, and the network setting unit 232 may be located in an operational management system that can be managed by a service provider of the network.

Figure 3:
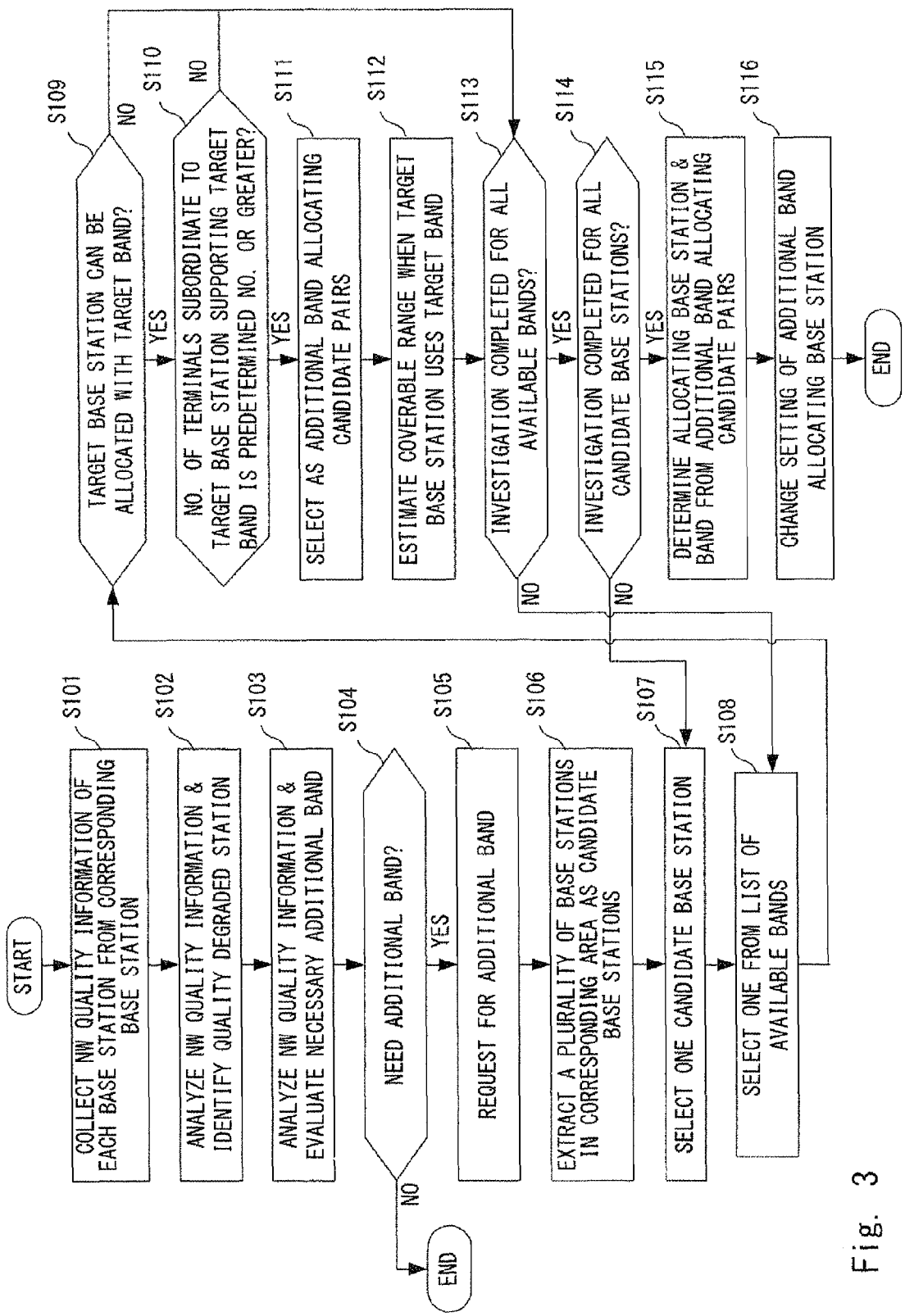
FIG. 3 is a flowchart showing an operation of the spectrum control system according to the second embodiment.

Next, an operation of the above-mentioned spectrum control system 21 is explained. FIG. 3 is a flowchart showing the operation of the spectrum control system 21 according to the second embodiment of the present invention, and specifically, it is a flowchart for spectrum control that allocates the additional band to the base station to be controlled by the spectrum control system 21.

In the spectrum control system of this embodiment, firstly, the information collecting unit 100 collects the information regarding the current network status from the base stations to be controlled by the spectrum control system 21 (step S101). Specifically, the information collecting unit 100 collects the network quality information and the terminal capability information as the information regarding the network status.

Next, the quality degraded base station identifying unit 211 compares the current value of the network quality of each base station (cell) acquired in the step S101 with the required value so as to identify the quality degraded base station (step S102).

Subsequently, the necessary band evaluating unit 212 evaluates the current value of the network quality of each base station (cell) acquired in the step S101 against the required value so as to evaluate how many additional bands are required (step S103).

The necessary band evaluating unit 212 evaluates whether it is necessary to allocate the additional band based on the evaluation result in the step S103 (step S104).

When the quality degraded base station is present and the additional band is needed (yes in the step S104), the necessary band evaluating unit 212 requests the allocating candidate extracting unit 120 to allocate the additional band (step S105). Meanwhile, when the additional band is not needed (no in the step S104), this operation ends.

Based on the request for allocating the additional band in the step S105, the allocating candidate extracting unit 120 extracts a plurality of base stations from an area including the quality degraded base station having the current value of the network quality not satisfying the required value as the additional band allocating candidates (candidate base stations) (step S106). At this time, the allocating candidate extracting unit 120 includes not only the quality degraded base station but the base stations satisfying the required value in the candidate base stations. The information of the extracted candidate base station is output to the additional band allocating base station and additional band determining unit 231. At this time, the information regarding the network status collected in the step S101 and the information regarding the necessary quantity of additional bands evaluated in the step S104 is also output to the additional band allocating base station and additional band determining unit 231.

Next, the additional band allocating base station and additional band determining unit 231 determines the base station to be actually allocated with the additional band and the additional band among the plurality of candidate base stations extracted by the allocating candidate extracting unit 120 (steps S107 to S115). The detailed flow in this determination is as follows.

The additional band allocating base station and additional band determining unit 231 selects one base station among the plurality of candidate base stations (step S107). Further, the additional band allocating base station and additional band determining unit 231 refers to the available band DB 20 and acquires the list of frequency bands available to the base station based on the base station position of the selected base station and selects one band from the list (step S108).

Next, the additional band allocating base station and additional band determining unit 231 refers to the base station DB 30 and evaluates whether or not it is possible to allocate the band (target band) selected in the step S108 to the base station (target base station) selected in the step S107 (step S109). Specifically, the additional band allocating base station and additional band determining unit 231 evaluates whether or not the target base station includes the function to communicate in the target band.

When the target base station includes the above-mentioned function (yes in the step S109), the additional band allocating base station and additional band determining unit 231 evaluates whether the number of terminals including the function to communicate in the target band is greater than or equal to a predetermined number among the terminals subordinate to the target base station based on the terminal capability information collected in the step S101 (step S110).

When the number of terminals including the above-mentioned function is greater than or equal to the predetermined number (yes in the step S110), the additional band allocating base station and additional band determining unit 231 selects pairs of the target base stations and the target bands as additional band allocating candidate pairs (step S111).

Next, the additional band allocating base station and additional band determining unit 231 estimates coverable ranges when the target base stations selected in the step S111 use the target bands (S112).

Specifically, in the network quality information collected by the information collecting unit 100, the additional band allocating base station and additional band determining unit 231 especially uses the histogram (wireless quality information) of reception signal power or signal-to-noise interference ratio of subordinate terminals. Such a histogram shows the quality distribution in the band that has been used by the terminal subordinate to the base station before using the target band, in other words, the licensed band or the additional band that has already been allocated. It is assumed that signals from the same transmission source are emitted in these bands and the target band currently under evaluation, thus the reception signal power of the terminal when the target base station uses the target band can be calculated by adding a difference resulting from a difference in frequencies to the above-mentioned histogram (wireless quality information). Here, the difference resulting from the difference in the frequencies can be calculated by the following method. Assuming a propagation model such as the Hata model, suppose that a term dependent on the frequency is g(f). Here, when reception signal power at a frequency f1 is P1, reception signal power P2 at a frequency f2 can be represented by the following expression 1.

$$P2=P1-g(f2)+g(f1) \quad \text{(Expression 1)}$$

The additional band allocating base station and additional band determining unit 231 can acquire the histogram of reception signal power or signal-to-noise interference ratio when the target base station uses the target band using the reception signal power calculated as above. The number and the ratio of the terminals having the reception signal power or the signal-to-noise interference ratio exceeding the predetermined value can be calculated and the coverable range when the target base station uses the target band can be calculated, using this histogram.

Note that in acquiring the histogram of the reception signal power or the signal-to-noise interference ratio when the target base station uses the target band, it is preferable to acquire the histogram only of the terminals including the function to communicate in the target band taking into consideration of the terminal capability information collected by the information collecting unit 100. Further, it is preferable to specify the terminals that have been communicating with the quality degraded base station before the target base station uses the target band and that are estimated to communicate in the target band when the target base station uses the target band with reference to the network quality information collected by the information collecting unit 100 so as to calculate the coverable range when the target base station uses the target band from the number or the ratio of the specified terminals.

When the estimation of the coverable range is completed in the step S112, an evaluation is made whether the investigation is completed for all available bands in the list of bands available to the target base station (step S113). In the case where, in the step S109, the target base station does not include the function to communicate in the target band (no in the step S109) or in the case where, in the step S110, the number of terminals including the function to communicate in the target band is not greater than or equal to the predetermined number among the terminals subordinate to the target base station (no in the step S110), the step S113 is performed.

When the investigation is not completed for all the available bands in the list of bands available to the target base station (no in the step S113), the additional band allocating base station and additional band determining unit 231 selects one of the bands that has not been selected yet from the list of the available bands (return to step S108).

When the investigation is completed for all the available bands (yes in the step S113), the additional band allocating base station and additional band determining unit 231 evaluates whether the investigation is completed for all the target base stations extracted in the step S106 (step S114). When the investigation is not completed (no in the step S114), the additional band allocating base station and additional band determining unit 231 selects one of the base stations that has not been selected yet among the candidate base stations (return to step S107).

When the investigation is completed for all the candidate base stations (yes in the step S114), the additional band allocating base station and additional band determining unit 231 determines the base station to be actually allocated with the additional band (additional band allocating base station) and the additional band to be allocated among the pairs of base stations and the bands selected in the step S111 (step S115). At this time, the additional band allocating base station and the additional band determining unit 231 refers to the result of the step S112 and determines the pair having the coverable range when the target base station uses the target band exceeding the predetermined value as the final additional band allocating base station and the additional band.

Lastly, the network setting unit 232 changes the network setting for allocating the additional band to the additional band allocating base station determined in the step S115 (step S116).

Note that in the above explanation, the evaluation is made to determine the additional band allocating base station depending on whether the number of terminals including the function to communicate in the additional band is greater than or equal to the predetermined number among the terminals subordinate to the base station, however this evaluation processing may not be performed. In such a case, the information collecting unit 100 is no longer required to acquire the terminal capability information. The step S110 also becomes unnecessary in the operation.

The above-mentioned explanation assumed the case where the available band is determined depending on the position of the base station using the additional band under the regulation regarding the use of the additional band. The available band DB 20 is thus explained as a database storing the list of available frequency bands according to the position of the transmitting station. However, the present invention is not limited to this configuration.

For example, under the regulation regarding the use of the additional band, there may be a case where the allowed transmission power to be complied with in the case of using the additional band is different depending on the installation states of the base stations (the installation height of the transmission antenna and types of fixed and mobile station). In order to respond to such a case, the available band DB 20 stores a list of available bands and allowed transmission power according to the installation height of the transmission antenna and types of fixed and mobile stations, in addition to the position of the transmitting station.

In such a case, in the step S108, the additional band allocating base station and additional band determining unit 231 acquires a list of available frequency bands and allowed transmission power based on the installation height of the transmission antenna in addition to the installation position of the base station and selects one band from the list. Further, in the step S112, the coverable range when the target base station uses the target band is estimated based on this allowed transmission power.

When the allowed transmission power is used, in the step S115, the additional band allocating base station and the additional band may be determined based on the coverable range estimated in the step S112. However, more simply, the additional band allocating base station and the additional band may be determined based on the allowed transmission power. Specifically, the pair of the base station and the band having the allowed transmission power being greater than or equal to the predetermined value shall be the additional band allocating base station and the additional band among the pairs of base stations and the bands selected in the step S111. Alternatively, among the pairs of the base stations and bands selected in the step S111, the pair having the maximum allowed transmission power may be the additional band allocating base station and the additional band. When the allowed transmission power is used, the step S112 becomes unnecessary.

According to this embodiment, it is possible to greatly improve the characteristics of the wireless communication system even when the base station or the terminal of the wireless communication system does not include the function to communicate in the additional band. For example, even when the base station is no longer capable of satisfying the predetermined level of quality and the base station does not include the function to communicate in the additional band, the additional band can be allocated to a different neighboring base station. By doing so, it is possible to expect distribution of loads and reduction in the interference thereby to greatly improve the characteristics of the wireless communication system. In a similar manner, for example, even when the base station is no longer capable of satisfying the predetermined level of quality and the base station has almost no subordinate terminal including the communication function in the additional band, the additional band can be allocated to a different neighboring base station. By doing so, it is possible to expect distribution of loads and reduction in the interference thereby to greatly improve the characteristics of the wireless communication system.

Moreover, in the above embodiment, under the regulation regarding use of the additional band, even when the allowed transmission power to be complied with in the case of using the additional band is different depending on the installation states of the base stations (the installation height of the transmitting station and types of fixed station and mobile station), it is possible to greatly improve the characteristics of the wireless communication system. For example, even when the base station is no longer capable of satisfying the predetermined level of quality and the base station is installed at a position high above the ground, the additional band can be allocated to a different neighboring base station installed at a position close to the ground. By doing so, it is possible to expect distribution of loads and reduction in the interference thereby to greatly improve the characteristics of the wireless communication system.

This advantage is especially effective in the heterogeneous network in which macrocell and microcell base stations having antennas installed on a tower or a building roof and a picocell base station having an antenna installed at a lower position such as on a telephone pole are located in the same area, so that the coverage of the macrocell and microcell base station and the picocell station overlap.

Figure 4:
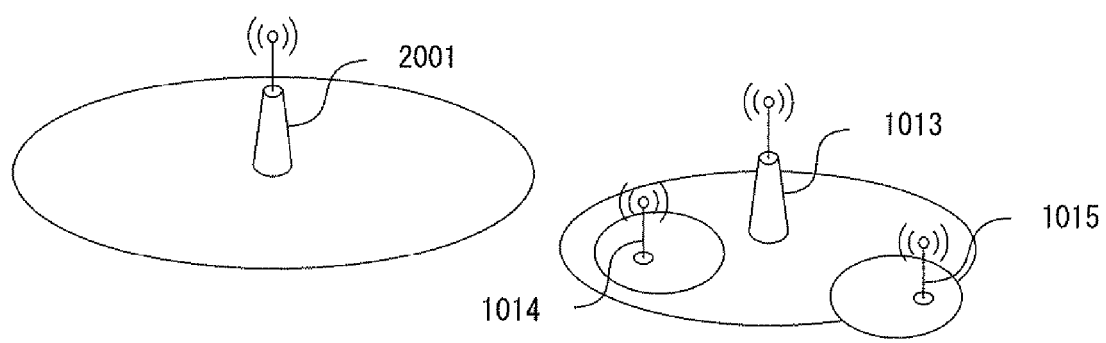
FIG. 4 is a diagram for explaining an applied example of the present invention in a heterogeneous network.

FIG. 4 is a drawing for explaining an applied example of the present invention in the heterogeneous network. In FIG. 4, base stations 1013, 1014, and 1015 attempt to use a band licensed to a primary system 2001 as their own additional band. Here, the base station 1013 is a macrocell base station, and the base stations 1014 and 1015 are picocell base stations. In the environment shown in FIG. 4, when the macrocell base station 1013 is no longer capable of satisfying the predetermined level of quality, by allocating the additional band to the picocell base station 1014 or 1015 instead to the macrocell base station 1013 with limited transmission power, it is possible to expect load distribution and interference reduction and thereby to greatly improve the characteristics of the wireless communication system.

Third Embodiment

Figure 5:
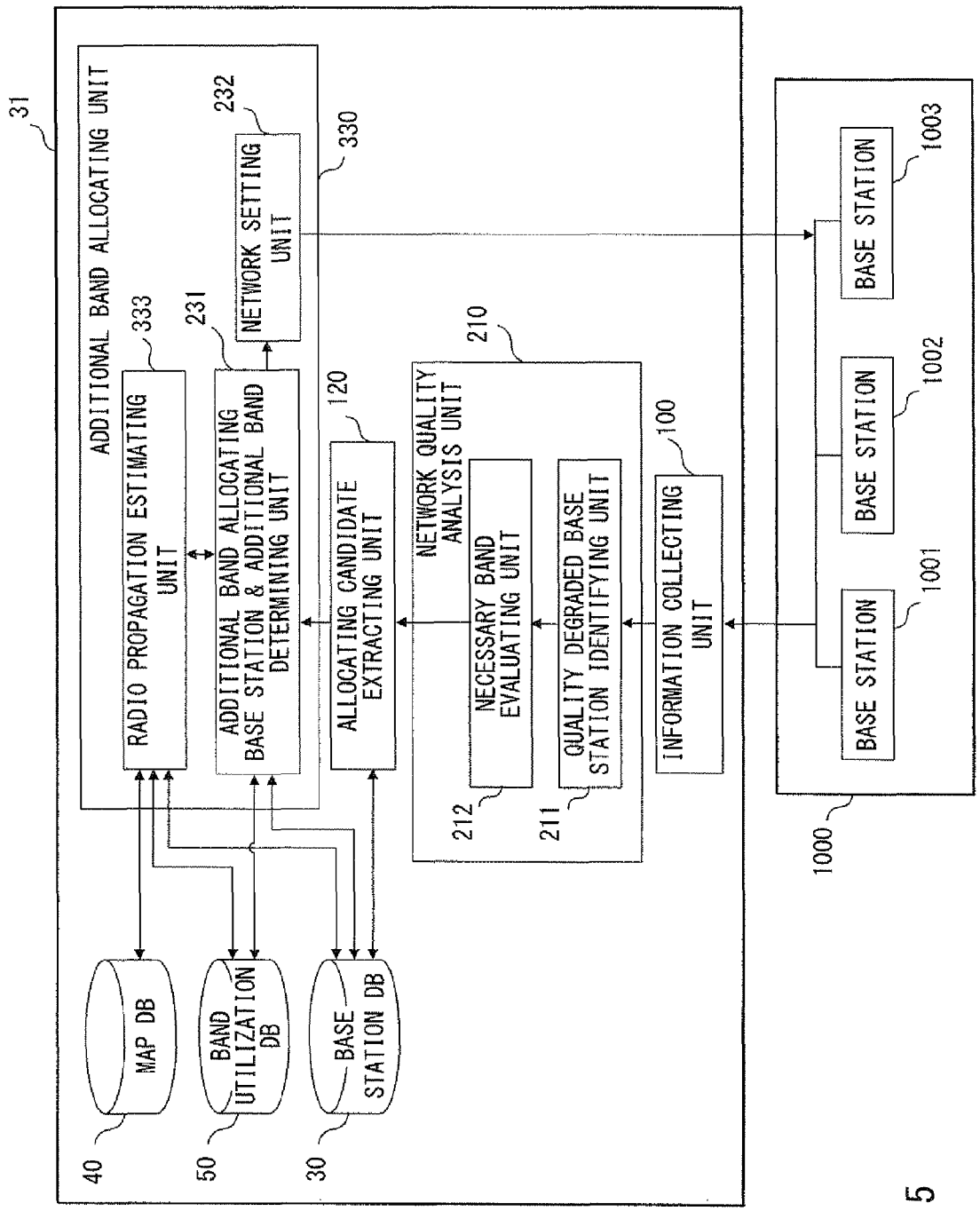
FIG. 5 is a block diagram of a spectrum control system according to a third embodiment.

FIG. 5 is a system configuration diagram of the wireless communication system including a spectrum control system 31 according to a third embodiment of the present invention. In this embodiment, a map DB 40, a band utilization DB 50, and a radio propagation estimating unit 333 are further included in addition to the configuration of the second embodiment. This embodiment assumes, under the regulation regarding the use of the additional band, the case of estimating, before using the additional band, the amount of interference imposed on the primary system when the base station uses the additional band and specifying the allowed transmission power such that the estimated amount of interference will be less than or equal to a specified value. Therefore, the radio propagation estimating unit 333, the map DB 40, and the band utilization DB 50 used for estimating the amount of interference, for example, are further required. Meanwhile, the available band DB 20 included in the second embodiment becomes unnecessary.

The base station DB 30 of this embodiment stores, in addition to the information regarding whether each base station can communicate in the additional band, at least information regarding the installation position, the installation height, gain, and a radiation pattern of the transmitting antenna of each base station as base station information.

The map DB 40 is a database that stores map information used to estimate radio propagation. Specifically, the map DB 40 stores altitude information indicating an altitude of each point in the areas divided into mesh and land utilization information regarding utilization of land for each limited area. The map DB 40 may further store building information such as a location, height, and floor of each building.

The band utilization DB 50 is a database that stores the band utilization of the wireless system that uses the band to be controlled by the spectrum control system 31. Specifically, the band utilization DB 50 stores, for each band, information such as transmission power and a transmission signal format of the transmitting station of the wireless system to be used, the installation position, the installation height, the gain, and the radiation pattern of the antenna, and usage time of the band. The band utilization DB 50 also stores information regarding the allowable amount of interference. Preferably, the band utilization DB 50 also stores information regarding a coverage area of the wireless system, a position, the installation height, the gain, and the radiation pattern of an antenna of a receiving station in the coverage area.

Here, the primary system is included in the target wireless system. When the licensed band planned to be used by the primary system is already determined, the information of the licensed band to be used may be stored to the band utilization DB 50. Meanwhile, the wireless systems, for example the one that secondarily uses the frequency band that is licensed to other wireless system and the one that uses the shared band that is not licensed to any wireless system, use the band while recognizing the availability of the bands. Therefore, in such a case, the band availability information may be registered to the band utilization DB 50 when the band is used, and when the use of the band is suspended, the information may be abandoned or suspension of the use may be registered.

The radio propagation estimating unit 333 analyzes the propagation state of radio waves between a specified transmission point and reception point and calculates the propagation gain, receiving power, and the like. General statistical models such as the Hata model and Recommendation ITU-R p.1546 model can be applied to the analysis of the propagation state of radio waves. In such a statistical model, the land utilization information indicating the type such as urban or rural is used in addition to a distance between the transmission and reception points, the installation height, the gain, and the radiation pattern of the antenna.

Moreover, geometric modeling that takes into consideration of diffraction from mountains and reflection on the ground may be applied as another method for analyzing the propagation state of radio waves. In such geometric modeling, the altitude information between the transmission and reception points is used in addition to the installation position, the gain, and the radiation pattern of the transmission and reception points.

Alternatively, a deterministic model such as ray tracing may be applied as another method of analyzing the propagation state of radio waves. In such a deterministic model, the building information and the altitude information of the area including the transmission and reception points is used in addition to the installation position, the gain, and the radiation pattern of the transmission and reception points.

Note that as explained in the second embodiment, in the system configuration diagram shown in FIG. 5, the spectrum control system 31 is illustrated to include the base station DB 30, the map DB 40, the band utilization DB 50, the information collecting unit 100, the quality degraded base station identifying unit 211, the necessary band evaluating unit 212, the allocating candidate extracting unit 120, the additional band allocating base station and additional band determining unit 231, the network setting unit 232, and the radio propagation estimating unit 333, this embodiment is not limited to this.

For example, the map DB 40 and the band utilization DB 50 may be located on the Internet accessible to anyone as a database for investigating the available band. Moreover, the base station DB 30, the information collecting unit 100, the quality degraded base station identifying unit 211, the necessary band evaluating unit 212, and the network setting unit 232 may be located in an operational management system that can be managed by a service provider of the network.

Figure 6A:
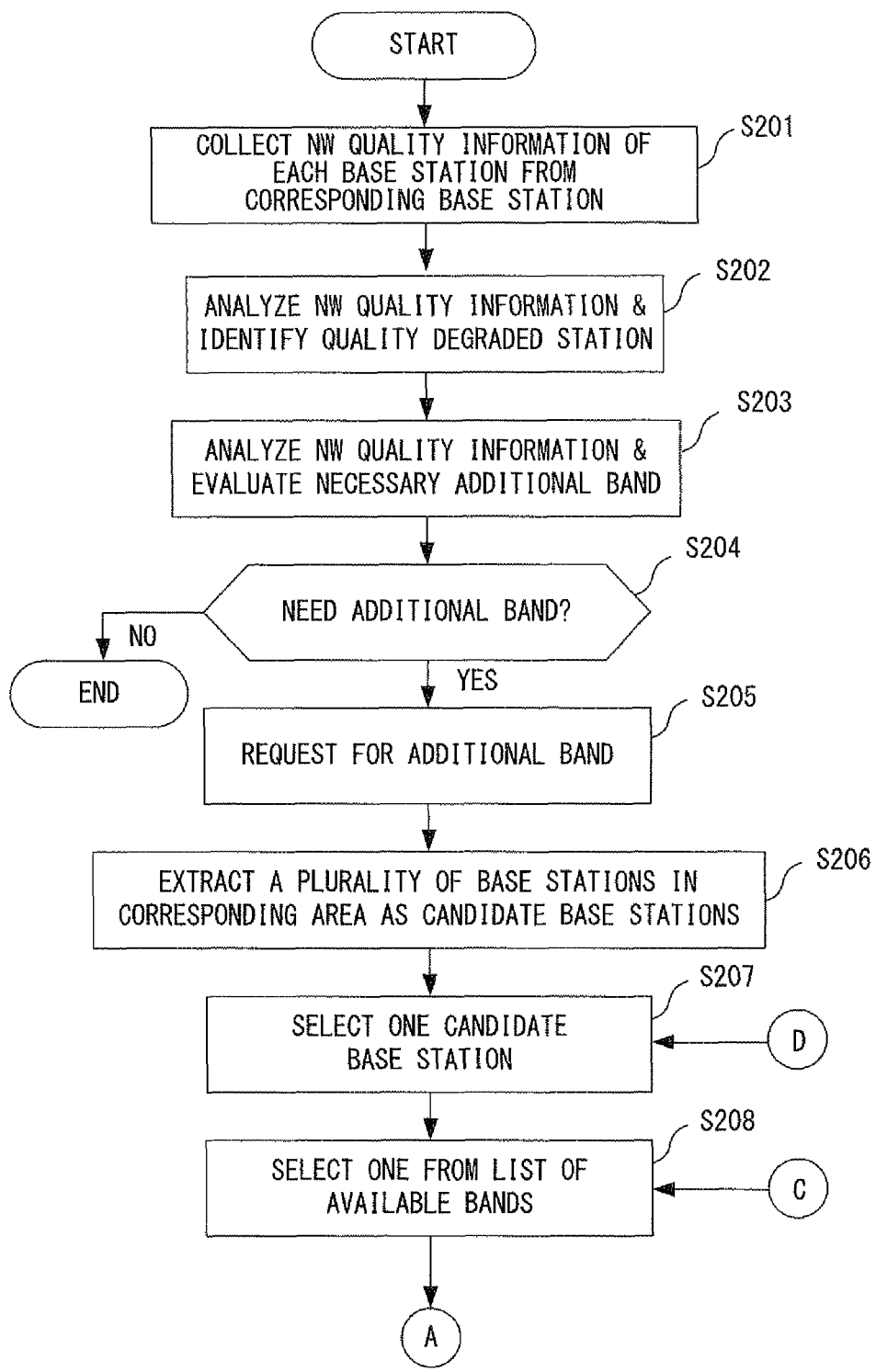
FIG. 6A is a flowchart showing a part of an operation of the spectrum control system according to the third embodiment.
Figure 6B:
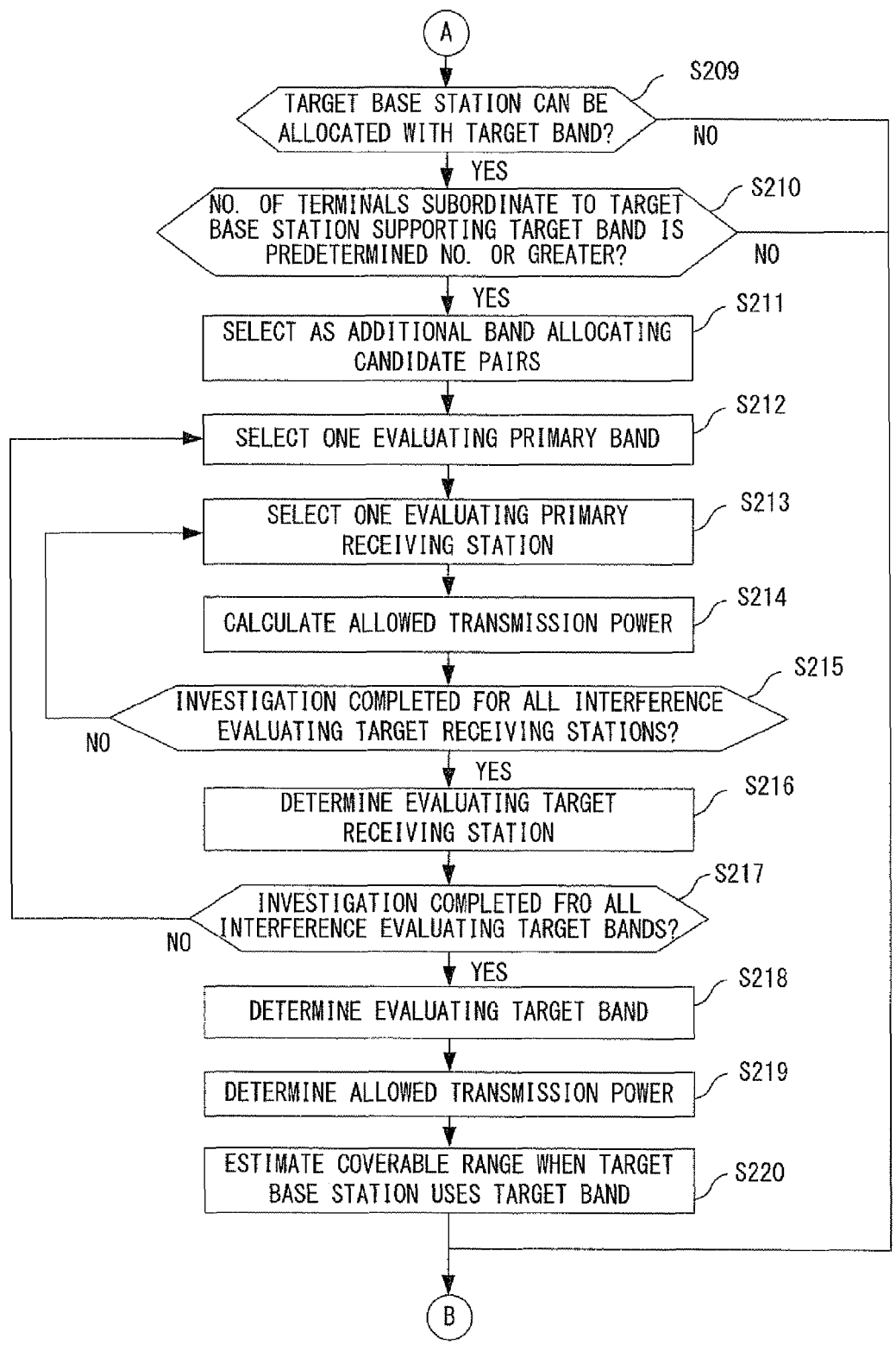
FIG. 6B is a flowchart showing a part of the operation of the spectrum control system according to the third embodiment.
Figure 6C:
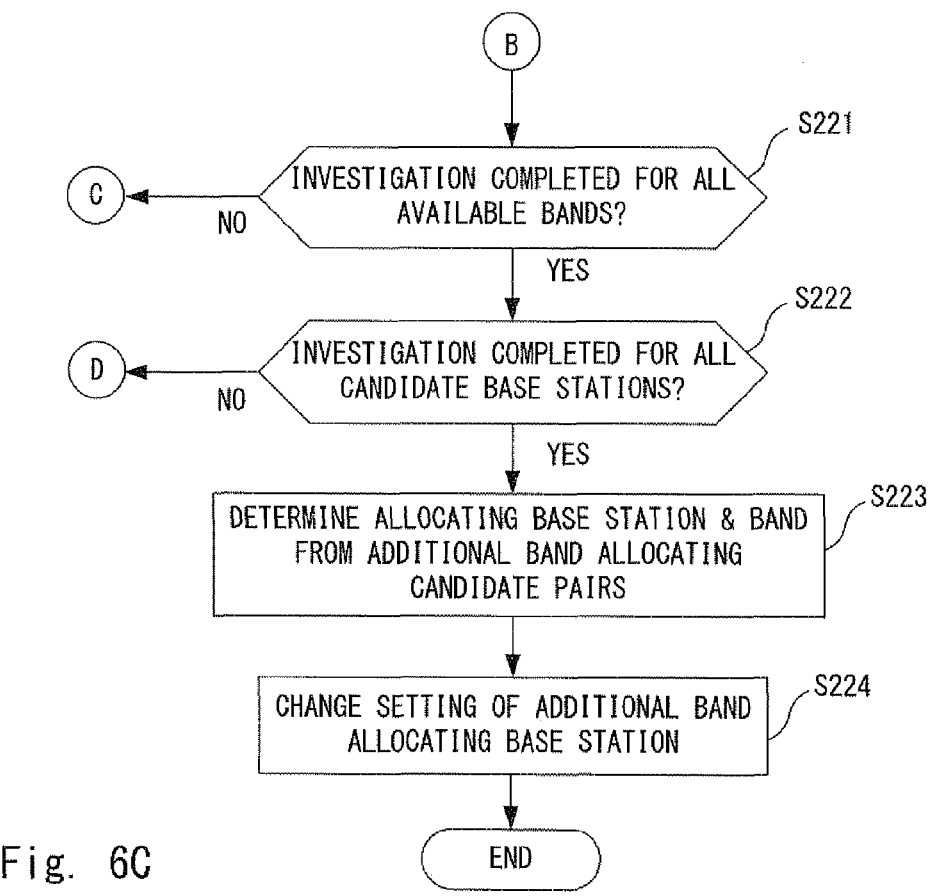
FIG. 6C is a flowchart showing a part of the operation of the spectrum control system according to the third embodiment.

Next, an operation of the spectrum control system of this embodiment is explained. FIGS. 6A to 6C are flowcharts showing the operation of the spectrum control system according to the third embodiment of the present invention. Specifically, it is a flowchart for spectrum control that allocates the additional band to the base station to be controlled by the spectrum control system 31.

Since the operations from the step S201 to the step S211 in this embodiment are the same as the operations from the step S101 to the step S111 in the second embodiment, the explanation shall not be provided here.

In this embodiment, after the step S211, the additional band allocating base station and additional band determining unit 231 and the radio propagation estimating unit 333 estimate the amount of interference imposed on the primary system when the base station uses the target band and calculate the allowed transmission power such that the amount of interference will be less than or equal to an allowed value. Then, the wave propagation estimating unit 333 estimates the coverable range when the target base station uses the target band based on the calculated allowed transmission power (from step S212 to step S220). The detailed flow is as follows.

First, the radio propagation estimating unit 333 selects one primary system band (evaluating primary band) to be evaluated for the amount of imposed interference when the target base station uses the target band (step S212). With regard to the interference imposed on the primary system, stronger interference may be imposed on a primary receiving station that uses a band adjacent to the same band as the target band than interference imposed on the primary receiving station that uses the same band as the target band. For this reason, it is preferable that the radio propagation estimating unit 333 performs interference evaluation not only on the same band but also on the peripheral bands. Then, the target band and the peripheral bands are defined as bands to be evaluated for the interference (interference evaluating target bands), and the wave propagation estimating unit 333 selects one of the interference evaluating target bands as the evaluating primary band.

Next, all or a part of receiving stations of the primary system using the evaluating primary band of the primary system are defined as the receiving stations to be evaluated for the interference (interference evaluating target receiving station), and the radio propagation estimating unit 333 selects one receiving station (evaluating primary receiving station) to be evaluated for the amount of imposed interference (step S213).

Here, suppose that there are a plurality of receiving stations that use the band. When the information of the receiving station in the coverage area of the primary system is stored to the band utilization DB 50, the radio propagation estimating unit 333 should select one receiving station as the evaluating primary receiving station.

When the band utilization DB 50 stores the information of the coverage area of the primary system but not the information of the receiving station, the radio propagation estimating unit 333 can estimate the position of the receiving station according to the service provided by the primary system and determine the receiving station as an interference evaluating target receiving station. For example, when the primary system is a television broadcasting system, it can be assumed that a receiving antenna is installed on a building roof in the coverage area, thus the radio propagation estimating unit 333 may assume that the interference evaluating target receiving station is positioned at a center of gravity of the building and at the position a few meters higher than the building height.

When the information of the coverage area of the primary system is not stored to the band utilization DB 50, the radio propagation estimating unit 333 estimates the radio propagation state of the peripheral areas from the transmitting station and calculates the receiving power at the receiving points in the area. In such a case, the radio propagation estimating unit 333 uses the transmission power and the transmission signal format of the transmitting station, the installation position, the installation height, the gain, and the radiation pattern of the antenna that are stored to the band utilization DB 50, and the map information of the surrounding areas of the transmitting station that is stored to the map DB 40. After that, the radio propagation estimating unit 333 evaluates whether or not the calculated receiving power is sufficient to enjoy the service provided by the primary system and determines the area evaluated to be sufficient as the coverage area of the primary system. In a similar manner as above, the radio propagation estimating unit 333 can estimate, based on the coverage area, the position of the receiving station according to the service provided by the primary system and determines the receiving station as the interference evaluating target receiving station.

Next, the radio propagation estimating unit 333 estimates the amount of interference imposed on the evaluating primary receiving station that uses the evaluating primary band when the target base station communicates in the target band and determines the allowed value of the transmission power such that the amount of interference will be less than or equal to the predetermined value (step S214).

In order to estimate the amount of imposed interference, the radio propagation estimating unit 333 estimates the radio propagation state from the transmitting antenna of the target base station to the receiving antenna of the evaluating primary receiving station and calculates the propagation gain between the transmitting and receiving antennas. At this time, the radio propagation estimating unit 333 calculates the propagation gain in consideration of the antenna gain using the installation position, the installation height, the gain, and the radiation pattern of the transmitting antenna of the target base station that are stored to the base station DB 30, and the position, the installation height, the gain, and the radiation pattern of the antenna of the receiving station of the primary system that are stored to the band utilization DB 50, and the map information between the transmitting and the receiving antennas that is stored to the map DB 40. The radio propagation estimating unit 333 determines the allowed value of the transmission power in the base station using the calculated propagation gain such that the amount of interference imposed on the evaluating primary receiving station will be less than or equal to the allowed amount of interference that is stored to the band utilization DB 50.

Next, the radio propagation estimating unit 333 evaluates whether the investigation is completed for all the interference evaluating target receiving stations (step S215). When the investigation is not completed for all the receiving stations (no in the step S215), the radio propagation estimating unit 333 selects one receiving station from the interference evaluating target receiving stations that has not been selected yet as the evaluating primary receiving station (return to the step S213). When the investigation is completed for all the receiving stations (yes in the step S215), the radio propagation estimating unit 333 determines, from the calculation result of the allowed transmission power in each evaluating primary receiving station, the receiving station having the minimum allowed transmission power or the receiving station within a predetermined ratio (bottom 5%, for example) as the receiving station to be evaluated (evaluating target receiving station) (step S216).

Subsequently, the radio propagation estimating unit 333 evaluates whether the investigation is completed for all interference evaluating target bands (step S217). When the investigation is not completed (no in the step S217), the radio propagation estimating unit 333 selects one band that has not been selected yet among the interference evaluating target bands as the evaluating primary band (return to step S212). When the investigation is completed for all the bands (yes in the step S217), the radio propagation estimating unit 333 determines the band having the minimum allowed transmission power from the calculation result of the allowed transmission power in the evaluating target receiving station as the band to be evaluated (evaluating target band) (step S218). In response to these results, the radio propagation estimating unit 333 determines the allowed transmission power in the evaluating target band by the evaluating target receiving station as the allowed transmission power when the target base station uses the target band (step S219).

Then, the additional band allocating base station and additional band determining unit 231 estimates the coverable range when the target base station uses the target band with the allowed transmission power acquired in the step S219 (step S220). As with the step S112 of the first embodiment, the additional band allocating base station and the additional band determining unit 231 may calculate the coverable range when the target base station uses the target band from the number or the ratio of the terminals having the reception signal power or signal-to-noise interference ratio exceeding a predetermined value. However, a different method is explained below.

More specifically, the radio propagation estimating unit 333 estimates the radio propagation state of the peripheral areas from the transmitting station of the target base station and calculates the receiving power of the receiving point in the area. In such a case, the radio propagation estimating unit 333 uses the allowed transmission power, the installation position, the installation height, the gain, and the radiation pattern of the antenna that are stored to the base station DB 30, and the map information of the surrounding areas of the transmitting station that is stored to the map DB 40. After that, the additional band allocating base station and additional band determining unit 231 evaluates whether or not the receiving power calculated by the radio propagation estimating unit 333 is sufficient to perform wireless communication with a predetermined level of quality and determines the area evaluated to be sufficient as the coverable range when the target base station uses the target band. Here, the additional band allocating base station and additional band determining unit 231 may calculate the coverable range simply from an area or volume or may calculate the coverable range using an index that is weighted according to the number of users using the land utilization information stored to the map DB 40 and population distribution.

Since the operations from the step S221 to the step S224 are the same as the operations from the step S113 to the step S116, the explanation shall not be provided here.

Note that although in the above explanation, the allowed transmission power is calculated from the amount of interference imposed on the primary system and the coverable range is estimated based on the calculated allowed transmission power, the present invention is not limited to this. For example, as with the second embodiment, the allowed transmission output may be specified by the available band DB 20 and the coverable range may be estimated based on the specified allowed transmission power. In this case, while the available band DB 20 becomes necessary, the step S214 becomes unnecessary.

Moreover, although in the above explanation, the coverable range is referred when the additional band allocating base station and the additional band are determined in the step S223, the present invention is not limited to this. For example, the allowed transmission power calculated in the step S219 may be referred, and a pair of the target base station and the target band having the allowed transmission power exceeding the predetermined value or a pair having the maximum allowed transmission power may be determined as the additional band allocating base station and the additional band. Alternatively, the amount of imposed interference on the primary system calculated in the previous step may be referred, and a pair of the target base station and the target band having the amount of imposed interference falling below the predetermined value or a pair having the minimum amount of imposed interference may be determined as the additional band allocating base station and the additional band.

According to this embodiment, it is possible to greatly improve the characteristics of the wireless communication system in the case of, under the regulation regarding the use of the additional band, estimating, before using the base station, an expected amount of interference imposed on the primary system when the base station uses the additional band and specifying the allowed transmission power such that the estimated amount of interference will be equal to or less than a specified value. For example, even when the base station is no longer capable of satisfying a predetermined level of quality and the base station and the receiver of the primary system are line-of-sight or the main axis of the antenna of the quality degraded base station faces the direction of the receiver of the primary system, the additional band can be allocated to a different neighboring base station. By doing so, it is possible to expect distribution of loads and reduction in the interference thereby to greatly improve the characteristics of the wireless communication system.

Note that in the first and third embodiments of the present invention, the network quality analysis unit identifies the quality degraded base station and evaluates the necessity of the additional band using the network quality information acquired by the information collecting unit 100 and requests allocation of the additional band depending on the result, however the present invention is not limited to such a configuration. For example, a configuration may be employed in which the base station itself monitors the network quality and evaluates the current value of the network quality against the required value. In such a case, when each base station evaluates the necessity of the additional band and decides that the allocation of the additional band is necessary, the base station requests the spectrum control system for the additional band. The spectrum control system thus requires a function to receive the additional band allocation request transmitted from the base stations 1001 to 1003. Meanwhile, the network quality analysis unit becomes unnecessary. Additionally, also in the operation, the step S101 (201) to the step S104 (204) become unnecessary, but instead, a step is added for receiving the additional band allocation request from the base stations 1001 to 1003.

Further, in the second and third embodiments, the network setting unit 232 changes the network setting for allocating the additional band to the additional band allocating base station. Meanwhile, in the present invention, the additional band could be allocated to the neighboring base station and not to the quality degraded base station that is no longer capable of satisfying the predetermined level of communication quality. This is to effectively achieve distribution of loads and reduction of interference. In order to further enhance such an advantage, it is preferable to control a part of the terminals that have originally been subordinate to the quality degraded base station to be subordinate to the additional band allocating base station, on the allocation of the additional band. To this effect, the network setting unit 232 may include a function to change a base station parameter regarding subordinate terminals. Specifically, the base station parameter regarding subordinate terminal is, for example, the transmission power and an antenna tilt angle of the additional band allocating base station and the quality degraded base station, and Cell Individual Offset (CIO) regarding handover. For example, by adjusting CIO of the additional band allocating base station and virtually increasing the coverage of the base station, a part of the terminals that have originally been subordinate to the quality degraded base station will be subordinate to the additional band allocating base station.

Moreover, in the second and third embodiments of the present invention, a series of processing such as collecting the network quality information and terminal capability information by the information collecting unit 100, evaluating necessity of the additional band by the necessary band evaluating unit 212, determining allocating target by the additional band allocating base station and additional band determining unit 231, and changing network setting by the network setting unit 232 is performed for each base station. However, the present invention is not limited to this configuration. For example, when the base station is composed of a plurality of cells, it is preferable that all the processing is performed for each cell.

Figure 7:
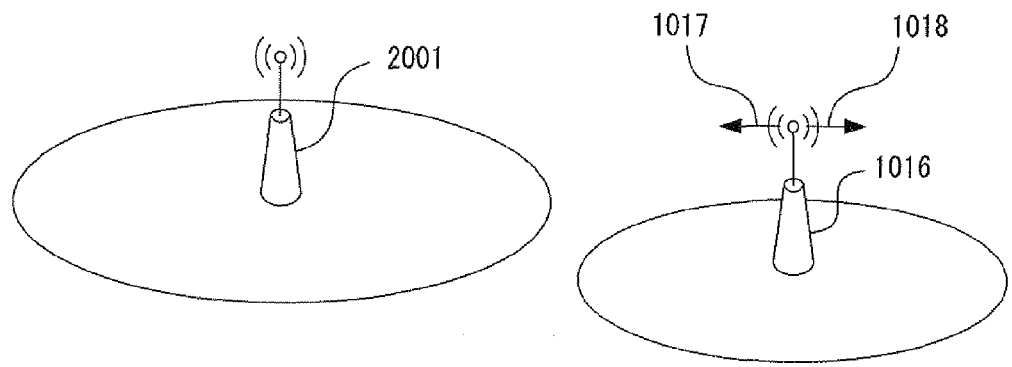
FIG. 7 is a drawing for explaining an applied example of the present invention in a configuration where one base station is composed of a plurality of cells.
Figure 8:
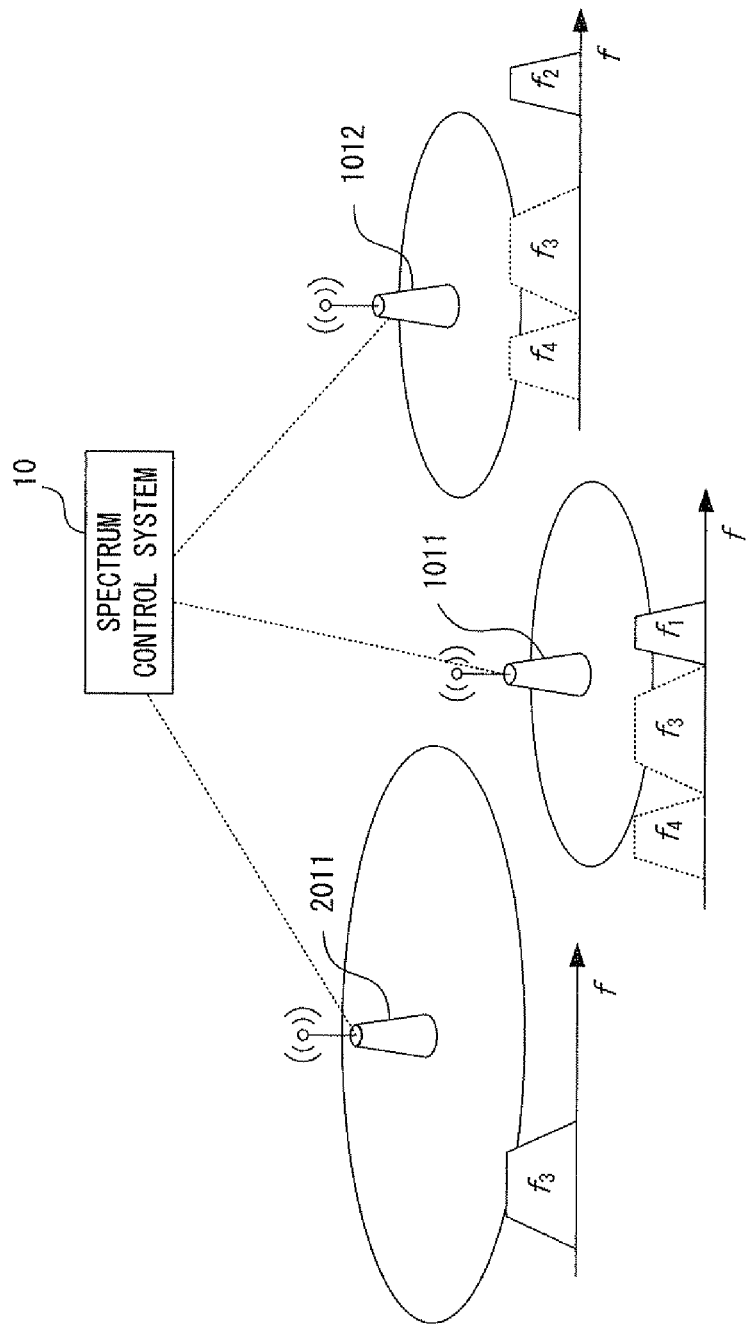
FIG. 8 is a conceptual diagram of a wireless system using a spectrum control system according to a related art.
Figure 9:
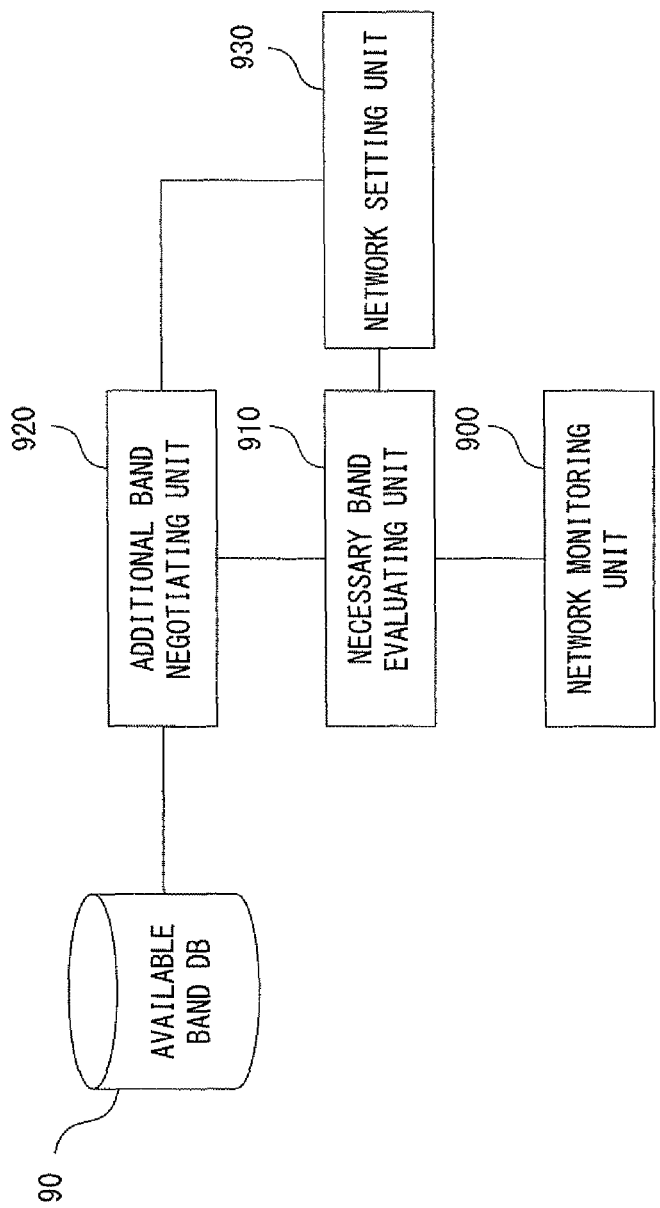
FIG. 9 is a system configuration diagram of the spectrum control system according to the related art.

FIG. 7 is a drawing for explaining an applied example of the present invention to a configuration in which one base station is composed of a plurality of cells. In FIG. 7, the base station 1016 attempts to use a band licensed to the primary system 2001 as its own additional band. Here, the base station 1016 is composed of two cells, which are cells 1017 and 1018. In the cell 1017, the main axis of the transmitting antenna faces the direction of the primary system, while in the cell 1018, the main axis of the transmitting antenna faces the opposite direction to the primary system. In the environment shown in FIG. 7, even when the cell 1017 is no longer capable of satisfying the predetermined level of quality, the additional band is allocated to the cell 1018 instead to the cell 1017 with limited transmission power because the main axis of the transmitting antenna in the cell 1017 faces the direction of the primary system. By doing so, it is possible to expect distribution of loads and reduction in the interference thereby to greatly improve the characteristics of the wireless communication system.

Although the above embodiments explained the present invention as hardware configuration, the present invention is not limited to this. The present invention can also be realized by causing a CPU (Central Processing Unit) to execute an arbitrary process on a computer program. The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present invention is not limited to the above embodiments but modifications can be made without departing from the scope of the present invention. For example, the present invention can also be described as the following modes.

(1) A spectrum control system comprising:

collecting means for collecting information regarding a network status of a wireless communication system;

identifying means for identifying a base station or a cell that does not satisfy a predetermined level of communication quality based on the information regarding the network status;

extracting means for extracting a plurality of base stations or a plurality of cells including the identified base station or the identified cell as additional band allocating candidates; and allocating means for allocating an additional band to the base station or the cell that satisfies a predetermined condition among the plurality of extracted base stations or the plurality of extracted cells.

(2) The spectrum control system according to (1), further comprising evaluating means for evaluating a quantity of the necessary additional bands based on the information regarding the network status, wherein the allocating means allocates the calculated quantity of the additional bands calculated by the evaluating means to the base station or the cell that satisfies the predetermined condition.

(3) The spectrum control system according to (2), wherein the evaluating means calculates the quantity of the additional bands to be allocated by comparing a current value of network quality with a required value based on the information regarding the network status.

(4) The spectrum control system according to any one of (1) to (3), wherein the extracting means extracts the base station or the cell that does not satisfy the predetermined level of communication quality and a peripheral base station or a peripheral cell as the additional band allocating candidates.

(5) The spectrum control system according any one of (1) to (3), wherein the extracting means extracts a base station or a cell, coverage of which overlapping with coverage of the base station or the cell that does not satisfy the predetermined level of communication quality, as the additional band allocating candidate.

(6) The spectrum control system according to any one of (1) to (5), wherein the allocating means allocates the additional band to the base station or the cell including a communication function in the additional band among the plurality of extracted base station or the plurality of extracted cells.

(7) The spectrum control system according to any one of (1) to (6), wherein the allocating means allocates the additional band to the base station or the cell having allowed transmission power, which is to be complied with when the additional band is used, exceeding a predetermined value among the plurality of extracted base station or the plurality of extracted cells.

(8) The spectrum control system according to any one of (1) to (7), wherein the allocating means allocates the additional band to the base station or the cell having the number or a ratio of subordinate terminals including the communication function in the additional band exceeding a predetermined value among the plurality of extracted base station or the plurality of extracted cells.

(9) The spectrum control system according to any one of (1) to (8), wherein the allocating means allocates the additional band to the base station or the cell having an estimated coverable range when the base station or the cell uses the additional band exceeding a predetermined value among the plurality of extracted base station or the plurality of extracted cells.

(10) The spectrum control system according to (9), wherein the allocating means allocates the additional band to the base station or the cell having the number or a ratio of terminals, that are subordinate to the base station or the cell not satisfying the predetermined level of communication quality before the additional band is used and that are estimated to communicate in the additional band when the additional band is used, exceeding a predetermined value among the plurality of extracted base station or the plurality of extracted cells.

(11) The spectrum control system according to (10), wherein, with regard to wireless quality information measured in another band different from the additional band, the allocating means estimates whether or not the terminal can communicate in the additional band using the wireless quality information that is added with a difference in propagation loss resulting from a difference in frequencies of the additional band and the other band.

(12) The spectrum control system according to any one of (1) to (11), wherein the allocating means allocates the additional band to the base station or the cell having an estimated amount of interference, which is imposed on another system different from the base station or the cell when the additional band is allocated to the base station or the cell, being less than a predetermined value.

(13) The spectrum control system according to any one of (1) to (12), further comprising changing means for changing a parameter in the base station or the cell that does not satisfy the predetermined level of communication quality or the base station or the cell to be actually allocated with the additional band by the allocating means, the parameter regarding subordinate terminal, wherein the changing means changes the parameter such that a part of the terminals, that have been subordinate to the base station or the cell not satisfying the predetermined level of communication quality before the allocating means allocates the additional band, are subordinate to the base station or the cell to be actually allocated with the additional band when the allocating means allocates the additional band.

(14) A spectrum control method comprising steps of:

collecting information regarding a network status of a wireless communication system;

identifying a base station or a cell that does not satisfy a predetermined level of communication quality based on the information regarding the network status;

extracting a plurality of base stations or a plurality of cells including the identified base station or the identified cell as additional band allocating candidates; and allocating an additional band to the base station or the cell that satisfies a predetermined condition among the plurality of extracted base stations or the plurality of extracted cells.

(15) The spectrum control method according to (14), further comprising a step of evaluating a quantity of the necessary additional bands based on the information regarding the network status, wherein the step of allocating allocates the calculated quantity of the additional bands calculated by the evaluating means to the base station or the cell that satisfies the predetermined condition.

(16) The spectrum control method according to (15), wherein the step of evaluating calculates the quantity of the additional bands to be allocated by comparing a current value of network quality with a required value based on the information regarding the network status.

(17) The spectrum control method according to any one of (14) to (16), wherein the step of extracting extracts the base station or the cell that does not satisfy the predetermined level of communication quality and a peripheral base station or a peripheral cell as the additional band allocating candidates.
(18) The spectrum control method according to any one of (14) to (16), wherein the step of extracting extracts a base station or a cell, coverage of which overlapping with coverage of the base station or the cell that does not satisfy the predetermined level of communication quality, as the additional band allocating candidate.
(19) The spectrum control method according to any one of (14) to (18), wherein the step of allocating allocates the additional band to the base station or the cell including a communication function in the additional band among the plurality of extracted base station or the plurality of extracted cells.
(20) The spectrum control method according to any one of (14) to (19), wherein the step of allocating allocates the additional band to the base station or the cell having allowed transmission power, which is to be complied with when the additional band is used, exceeding a predetermined value among the plurality of extracted base station or the plurality of extracted cells.
(21) The spectrum control method according to any one of (14) to (20), wherein the step of allocating allocates the additional band to the base station or the cell having the number or a ratio of subordinate terminals including the communication function in the additional band exceeding a predetermined value among the plurality of extracted base station or the plurality of extracted cells.
(22) The spectrum control method according to any one of (14) to (21), wherein the step of allocating allocates the additional band to the base station or the cell having an estimated coverable range when the base station or the cell uses the additional band exceeding a predetermined value among the plurality of extracted base station or the plurality of extracted cells.
(23) The spectrum control method according to (22), wherein the step of allocating allocates the additional band to the base station or the cell having the number or a ratio of terminals, that are subordinate to the base station or the cell not satisfying the predetermined level of communication quality before the additional band is used and that are estimated to communicate in the additional band when the additional band is used, exceeding a predetermined value among the plurality of extracted base station or the plurality of extracted cells.
(24) The spectrum control method according to (23), wherein, with regard to wireless quality information measured in another band different from the additional band, the step of allocating estimates whether or not the terminal can communicate in the additional band using the wireless quality information that is added with a difference in propagation loss resulting from a difference in frequencies of the additional band and the other band.
(25) The spectrum control method according to any one of (14) to (24), wherein the step of allocating allocates the additional band to the base station or the cell having an estimated amount of interference, which is imposed on another system different from the base station or the cell when the additional band is allocated to the base station or the cell, being less than a predetermined value.
(26) The spectrum control method according to any one of (14) to (25), further comprising a step of changing a parameter in the base station or the cell that does not satisfy the predetermined level of communication quality or the base station or the cell to be actually allocated with the additional band in the step of allocating, the parameter regarding subordinate terminal,
wherein the step of changing changes the parameter such that a part of the terminals, that have been subordinate to the base station or the cell not satisfying the predetermined level of communication quality before the additional band is allocated in the step of allocating, are subordinate to the base station or the cell to be actually allocated with the additional band when the additional band is allocated in the step of allocating.
(27) A non-transitory computer readable medium storing a spectrum control program that causes a computer to execute:
a collecting process that collects information regarding a network status of a wireless communication system;
an identifying process that identifies a base station or a cell that does not satisfy a predetermined level of communication quality based on the information regarding the network status;
an extracting process that extracts a plurality of base stations or a plurality of cells including a base station or a cell other than the identified base station or the identified cell as additional band allocating candidates; and
an allocating process that allocates an additional band to the base station or the cell that satisfies a predetermined condition among the plurality of extracted base stations or the plurality of extracted cells.
(28) A wireless communication system using the method according to any one of (14) to (26).
(29) The wireless communication system according to (28), further comprising a band that is licensed or allowed for preferential use in addition to the additional band.

Although the present invention has been explained with reference to the embodiments so far, the present invention is not limited by above. Various modification, obvious to those in the related art, can be made to the configurations and details of the present invention within the scope of the present invention.

The present application claims priority rights of and is based on Japanese Patent Application No. 2011-112814 filed on May 19, 2011 in the Japanese Patent Office, the entire contents of which are hereby incorporated by reference.

INDUSTRIAL APPLICABILITY

The present invention can be used to various wireless communication systems such as a mobile communication system.

REFERENCE SIGNS LIST

1001 to 1003 BASE STATION
10 SPECTRUM CONTROL SYSTEM
11 SPECTRUM CONTROL SYSTEM
21 SPECTRUM CONTROL SYSTEM
31 SPECTRUM CONTROL SYSTEM
20 AVAILABLE BAND DB
30 BASE STATION DB
40 MAP DB
50 BAND UTILIZATION DB
90 AVAILABLE BAND DB
100 INFORMATION COLLECTING UNIT
110 NETWORK QUALITY ANALYSIS UNIT
120 ALLOCATING CANDIDATE EXTRACTING UNIT
130 ADDITIONAL BAND ALLOCATING UNIT
210 NETWORK QUALITY ANALYSIS UNIT
211 QUALITY DEGRADED BASE STATION IDENTIFYING UNIT

212 NECESSARY BAND EVALUATING UNIT
230 ADDITIONAL BAND ALLOCATING UNIT
231 ADDITIONAL BAND ALLOCATING BASE STATION AND ADDITIONAL BAND DETERMINING UNIT
232 NETWORK SETTING UNIT
330 ADDITIONAL BAND ALLOCATING UNIT
333 RADIO PROPAGATION ESTIMATING UNIT
900 NETWORK MONITORING UNIT
910 NECESSARY BAND EVALUATING UNIT
920 ADDITIONAL BAND NEGOTIATING UNIT
930 NETWORK SETTING UNIT
1000 WIRELESS COMMUNICATION SYSTEM
1009 BASE STATION
1011 BASE STATION
1013 MACROCELL BASE STATION
1014 PICOCELL BASE STATION
1016 BASE STATION
1017 CELL
1018 CELL
2000 WIRELESS SYSTEM
2001 PRIMARY SYSTEM
2011 TRANSMITTING STATION

The invention claimed is:

1. A spectrum control system comprising:
an identifying unit that identifies a base station or a cell that does not satisfy a predetermined level of communication quality based on information regarding a network status;
an extracting unit that extracts a plurality of base stations or a plurality of cells comprising a base station or a cell other than the identified base station or the identified cell as additional band allocating candidates; and
an allocating unit that allocates an additional band to the base station or the cell that satisfies a predetermined condition among the plurality of extracted base stations or the plurality of extracted cells, wherein
the extracting unit extracts the identified base station or the identified cell, which is the base station or the cell that does not satisfy the predetermined level of communication quality, and a peripheral base station or a peripheral cell around the identified base station or the identified cell as the additional band allocating candidates;
when the identified base station or the identified cell does not satisfy the predetermined condition, the allocating unit allocates the additional band to the peripheral base station or the peripheral cell that satisfies the predetermined condition; and
the predetermined condition comprises a number or a ratio of subordinate terminals including a communication function in the additional band exceeding a predetermined value.

2. The spectrum control system according to claim 1, wherein the extracting unit extracts a base station or a cell, coverage of which overlaps with coverage of the base station or the cell that does not satisfy the predetermined level of communication quality, as the additional band allocating candidate.

3. The spectrum control system according to claim 1, wherein the predetermined condition comprises the communication function in the additional band.

4. The spectrum control system according to claim 1, wherein the predetermined condition comprises allowed transmission power to be complied with when the additional band is used exceeds a predetermined value.

5. The spectrum control system according to claim 1, wherein the predetermined condition comprises an estimated coverable range when the base station or the cell uses the additional band exceeding a predetermined value.

6. The spectrum control system according to claim 5, wherein the predetermined condition comprises a number or a ratio of terminals, that are subordinate to the base station or the cell not satisfying the predetermined level of communication quality before the additional band is used and that are estimated to communicate in the additional band when the additional band is used, exceeding a predetermined value.

7. The spectrum control system according to claim 6, wherein, with regard to wireless quality information measured in another band different from the additional band, the allocating unit estimates whether or not the terminal can communicate in the additional band using the wireless quality information that is added and a difference in propagation loss resulting from a difference in frequencies of the additional band and the other band.

8. The spectrum control system according to claim 1, wherein the predetermined condition comprises an estimated amount of interference imposed on another system different from the base station or the cell when the additional band is allocated to the base station or the cell is less than a predetermined value.

9. The spectrum control system according to claim 1, further comprising a changing unit that changes a parameter in the base station or the cell that does not satisfy the predetermined level of communication quality or the base station or the cell to be actually allocated with the additional band by the allocating unit, the parameter regarding subordinate terminal, wherein the changing unit changes the parameter such that a part of the terminals, that have been subordinate to the base station or the cell not satisfying the predetermined level of communication quality before the allocating unit allocates the additional band, are subordinate to the base station or the cell to be actually allocated with the additional band when the allocating unit allocates the additional band.

10. The spectrum control system according to claim 1, further comprising an evaluating unit that evaluates a quantity of the necessary additional bands based on the information regarding the network status, wherein the allocating unit allocates the calculated quantity of the additional bands calculated by the evaluating unit to the base station or the cell that satisfies the predetermined condition.

11. The spectrum control system according to claim 10, wherein the evaluating unit calculates the quantity of the additional bands to be allocated by comparing a current value of network quality with a required value based on the information regarding the network status.

12. A spectrum control method comprising steps of:
identifying a base station or a cell that does not satisfy a predetermined level of communication quality based on information regarding a network status;
extracting a plurality of base stations or a plurality of cells including a base station or a cell other than the identified base station or the identified cell as additional band allocating candidates; and
allocating an additional band to the base station or the cell that satisfies a predetermined condition among the plurality of extracted base stations or the plurality of extracted cells,
wherein the extracting comprises extracting the identified base station or the identified cell, which is the base station or the cell that does not satisfy the predetermined level of communication quality, and a peripheral base station or a peripheral cell around the identified base station or the identified cell as the additional band allocating candidates;

when the identified base station or the identified cell does not satisfy the predetermined condition, the allocating the additional band to the peripheral base station or the peripheral cell that satisfies the predetermined condition; and the predetermined condition comprises a number or a ratio of subordinate terminals including a communication function in the additional band exceeding a predetermined value.

13. The spectrum control method according to claim 12, wherein the step of extracting extracts a base station or a cell, coverage of which overlaps with coverage of the base station or the cell that does not satisfy the predetermined level of communication quality, as the additional band allocating candidate.

14. The spectrum control method according to claim 12, wherein the predetermined condition comprises the communication function in the additional band.

15. The spectrum control method according to claim 12, wherein the predetermined condition comprises allowed transmission power to be complied with when the additional band is used exceeds a predetermined value.

16. The spectrum control method according to claim 12, wherein the predetermined condition comprises an estimated coverable range when the base station or the cell uses the additional band exceeding a predetermined value.

17. The spectrum control method according to claim 16, wherein the predetermined condition comprises a number or a ratio of terminals, that are subordinate to the base station or the cell not satisfying the predetermined level of communication quality before the additional band is used and that are estimated to communicate in the additional band when the additional band is used, exceeds a predetermined value.

18. The spectrum control method according to claim 17, wherein, with regard to wireless quality information measured in another band different from the additional band, the step of allocating estimates whether or not the terminal can communicate in the additional band using the wireless quality information that is added and a difference in propagation loss resulting from a difference in frequencies of the additional band and the other band.

19. The spectrum control method according to claim 12, wherein the predetermined condition comprises an estimated amount of interference imposed on another system different from the base station or the cell is less than a predetermined value.

20. The spectrum control method according to claim 12, further comprising a step of changing a parameter in the base station or the cell that does not satisfy the predetermined level of communication quality or the base station or the cell to be actually allocated with the additional band in the step of allocating, the parameter regarding subordinate terminal, wherein the step of changing changes the parameter such that a part of the terminals, that have been subordinate to the base station or the cell not satisfying the predetermined level of communication quality before the additional band is allocated in the step of allocating, are subordinate to the base station or the cell to be actually allocated with the additional band when the additional band is allocated in the step of allocating.

21. The spectrum control method according to claim 12, further comprising a step of evaluating a quantity of the necessary additional bands based on the information regarding the network status, wherein in the step of allocating, the calculated quantity of the additional bands calculated in the step of evaluating are allocated to the base station or the cell that satisfies the predetermined condition.

22. The spectrum control method according to claim 21, wherein the step of evaluating comprises calculating the quantity of the additional bands to be allocated by comparing a current value of network quality with a required value based on the information regarding the network status.

23. A wireless communication system using the spectrum control method according to claim 12.

24. The wireless communication system according to claim 23, further comprising a band that is licensed or allowed for preferential use in addition to the additional band.

25. A non-transitory computer readable medium storing a spectrum control program that causes a computer to execute:

an identifying process that identifies a base station or a cell that does not satisfy a predetermined level of communication quality based on information regarding a network status;

an extracting process that extracts a plurality of base stations or a plurality of cells including a base station or a cell other than the identified base station or the identified cell as additional band allocating candidates; and an allocating process that allocates an additional band to the base station or the cell that satisfies a predetermined condition among the plurality of extracted base stations or the plurality of extracted cells, wherein the extracting process extracts the identified base station or the identified cell, which is the base station or the cell that does not satisfy the predetermined level of communication quality, and a peripheral base station or a peripheral cell around the identified base station or the identified cell as the additional band allocating candidates;

when the identified base station or the identified cell does not satisfy the predetermined condition, the allocating process allocates the additional band to the peripheral base station or the peripheral cell that satisfies the predetermined condition; and the predetermined condition comprises a number or a ratio of subordinate terminals including a communication function in the additional band exceeding a predetermined value.

26. A spectrum control system comprising:

identifying means for identifying a base station or a cell that does not satisfy a predetermined level of communication quality based on information regarding a network status;

extracting means for extracting a plurality of base stations or a plurality of cells including a base station or a cell other than the identified base station or the identified cell as additional band allocating candidates; and allocating means for allocating an additional band to the base station or the cell that satisfies a predetermined condition among the plurality of extracted base stations or the plurality of extracted cells, wherein the extracting means extracts the identified base station or the identified cell, which is the base station or the cell that does not satisfy the predetermined level of communication quality, and a peripheral base station or a peripheral cell around the identified base station or the identified cell as the additional band allocating candidates;

when the identified base station or the identified cell does not satisfy the predetermined condition, the allocating means allocates the additional band to the peripheral base station or the peripheral cell that satisfies the predetermined condition;

and the predetermined condition comprises a number or a ratio of subordinate terminals including a communication function in the additional band exceeding a predetermined value.

* * * * *